United States Patent
Harvey

(10) Patent No.: US 8,550,257 B2
(45) Date of Patent: *Oct. 8, 2013

(54) CERAMIC WATER PURIFICATION DEVICE

(76) Inventor: Anthony Reid Harvey, Wellsville, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 12/792,261

(22) Filed: Jun. 2, 2010

(65) Prior Publication Data

US 2010/0237003 A1  Sep. 23, 2010

Related U.S. Application Data

(63) Continuation-in-part of application No. 11/832,179, filed on Aug. 1, 2007, which is a continuation-in-part of application No. 10/969,930, filed on Oct. 22, 2004, now Pat. No. 7,491,330, which is a continuation-in-part of application No. 10/112,936, filed on Apr. 2, 2002, now Pat. No. 6,905,598, which is a continuation-in-part of application No. 09/692,203, filed on Oct. 20, 2000, now Pat. No. 6,537,939.

(60) Provisional application No. 61/183,336, filed on Jun. 2, 2009, provisional application No. 60/821,049, filed on Aug. 1, 2006.

(51) Int. Cl.
*B01D 24/00* (2006.01)

(52) U.S. Cl.
USPC .................. 210/510.1; 501/80; 501/81

(58) Field of Classification Search
USPC .................. 210/510.1; 501/80, 81
See application file for complete search history.

(56) References Cited

U.S. PATENT DOCUMENTS

| | | | |
|---|---|---|---|
| 2,066,710 A * | 1/1937 | Bado | 424/619 |
| 2,167,225 A * | 7/1939 | Van Eweyk | 210/266 |
| 2,508,602 A * | 5/1950 | Goetz | 424/125 |
| 3,097,411 A | 7/1963 | Gerster et al. | |
| 3,217,888 A * | 11/1965 | Fuchs | 210/266 |
| 3,392,837 A * | 7/1968 | Sanzenbacher | 210/282 |
| 3,654,149 A * | 4/1972 | Hedgpeth | 210/752 |
| 3,872,013 A * | 3/1975 | Nishino et al. | 210/317 |
| 4,045,553 A * | 8/1977 | Mitsumori et al. | 424/618 |
| 4,071,636 A * | 1/1978 | Nishino et al. | 427/244 |
| 4,222,874 A * | 9/1980 | Connelly | 210/650 |
| 4,389,311 A * | 6/1983 | La Freniere | 210/198.1 |
| 4,396,512 A * | 8/1983 | Beauman et al. | 210/668 |
| 4,440,867 A * | 4/1984 | Sabherwal | 502/62 |
| 4,463,031 A * | 7/1984 | Someya | 427/217 |
| 4,530,765 A * | 7/1985 | Sabherwal | 210/663 |
| 4,872,993 A * | 10/1989 | Harrison | 210/666 |
| 4,999,109 A * | 3/1991 | Sabre | 210/244 |
| 5,019,268 A | 5/1991 | Rogalla | |
| 5,342,528 A * | 8/1994 | Adachi et al. | 210/668 |
| 5,490,940 A * | 2/1996 | Bragg et al. | 210/671 |
| 5,597,479 A | 1/1997 | Johnson | |
| 5,750,026 A * | 5/1998 | Gadkaree et al. | 210/502.1 |

(Continued)

OTHER PUBLICATIONS

JP 360118285 A (Ogawa et al.) Jun. 25, 1985 abstract only.*

(Continued)

*Primary Examiner* — Paul Marcantoni
(74) *Attorney, Agent, or Firm* — Goodwin Procter, LLP

(57) ABSTRACT

A ceramic water purifying device is provided. The device includes a silver treated packed particle bed in one embodiment. The device may also include feldspar or bottled glass.

9 Claims, 15 Drawing Sheets

(56) References Cited

U.S. PATENT DOCUMENTS

| | | | | |
|---|---|---|---|---|
| 5,770,089 A * | 6/1998 | Kubo | | 210/661 |
| 6,254,894 B1 * | 7/2001 | Denkewicz et al. | | 424/618 |
| 6,420,292 B1 * | 7/2002 | Kumaoka | | 501/80 |
| 6,537,939 B1 * | 3/2003 | Harvey | | 501/81 |
| 6,905,598 B2 * | 6/2005 | Harvey | | 210/510.1 |
| 7,168,574 B2 * | 1/2007 | King | | 210/503 |
| 7,491,330 B2 * | 2/2009 | Harvey | | 210/510.1 |
| 7,947,619 B2 * | 5/2011 | Harvey | | 501/80 |
| 2008/0053895 A1 | 3/2008 | Harvey | | |

OTHER PUBLICATIONS

JP 362152587 A (Honma et al.) Jul. 7, 1987 abstract only.*
International Search Report dated Jul. 30, 2010.

* cited by examiner 0.24 mm 0.06 mm

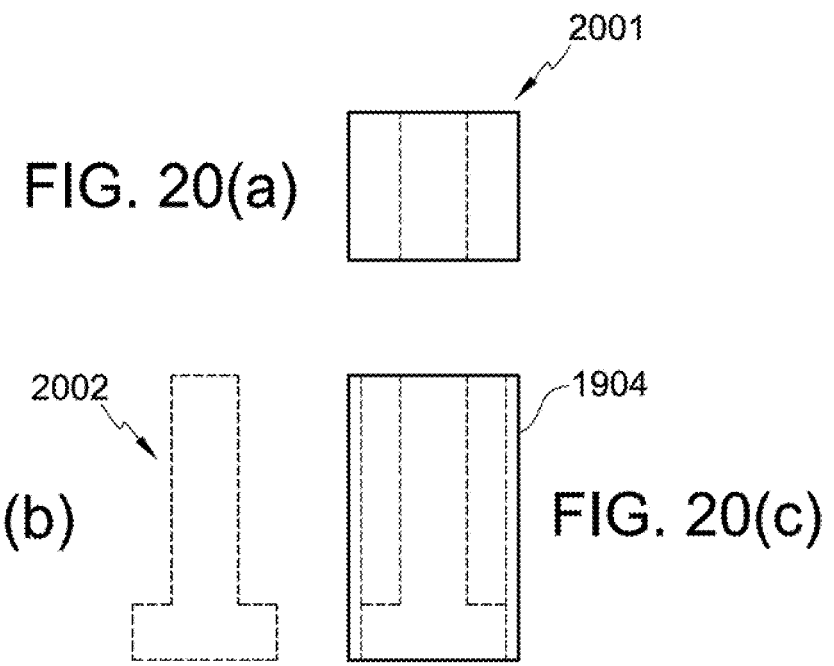
FIG. 20(a)
FIG. 20(b)
FIG. 20(c)
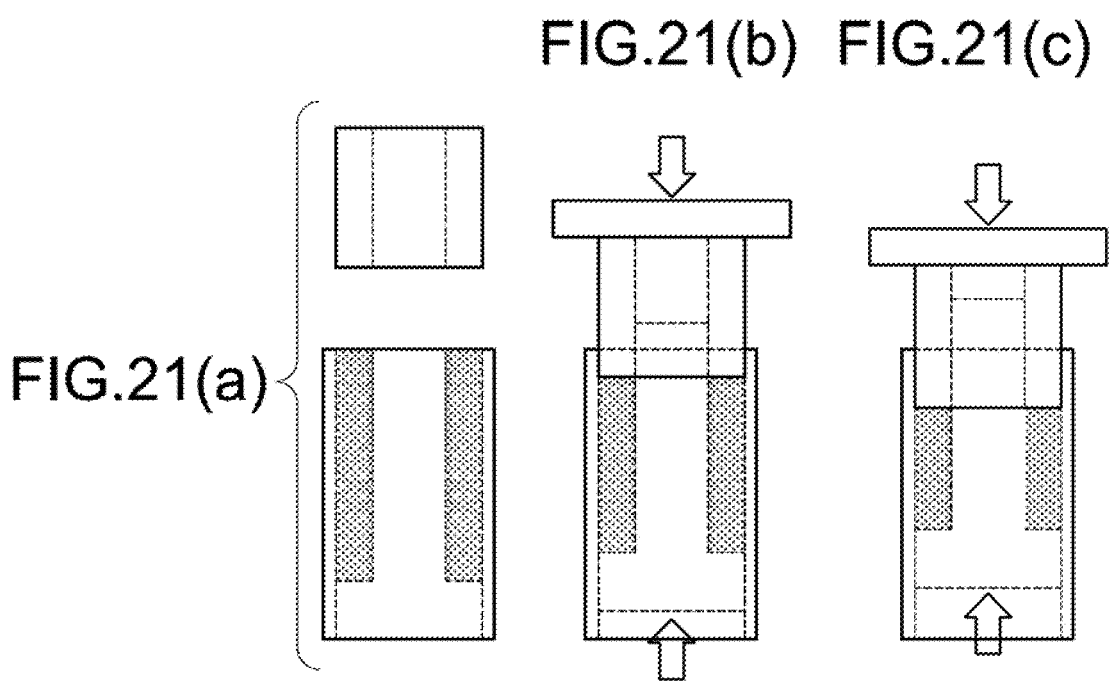
FIG. 21(a)
FIG. 21(b)
FIG. 21(c)

FIG. 23
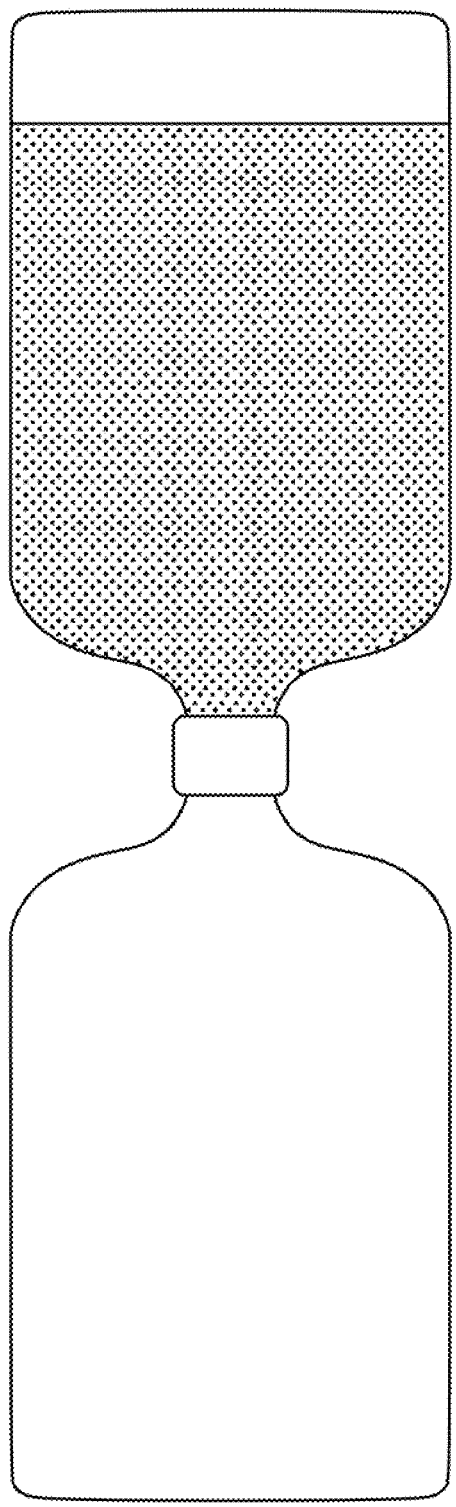
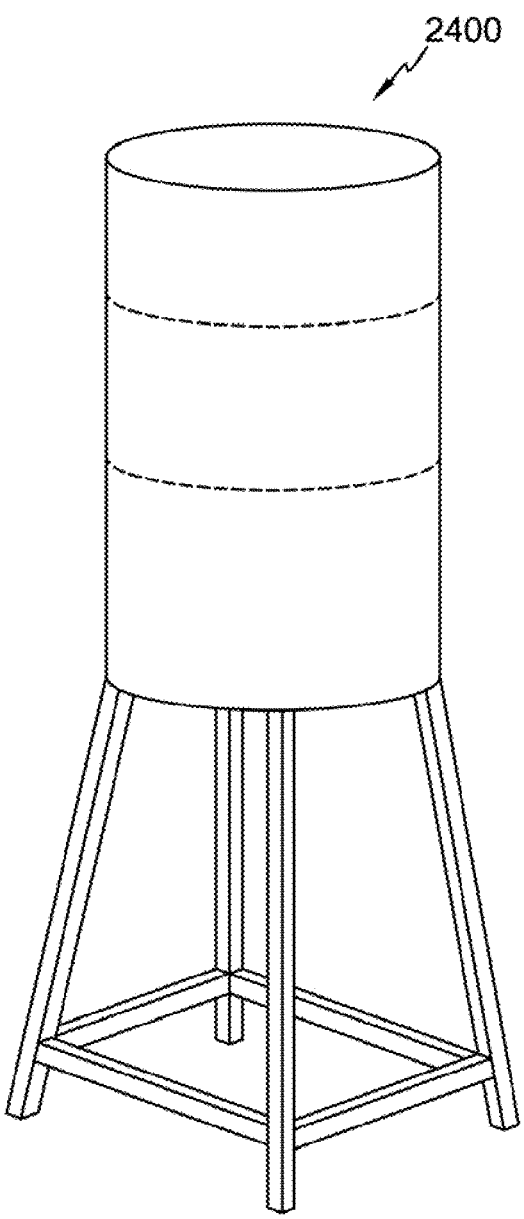
FIG. 24

1090°C

1230°C

CERAMIC WATER PURIFICATION DEVICE

CROSS-REFERENCE TO RELATED APPLICATIONS

This application claims the benefit under 35 USC 119(e) from U.S. Patent Application No. 61/183,336 filed Jun. 2, 2009, now expired, which is a continuation-in-part of U.S. patent application Ser. No. 11/832,179, filed Aug. 1, 2007, now U.S. Pat. No. 7,947,619, which claims priority from Provisional Application No. 60/821,049, filed Aug. 1, 2006, now expired, which is a continuation-in-part of U.S. patent application Ser. No. 10/969,930, filed Oct. 22, 2004, now U.S. Pat. No. 7,491,330, which is a continuation-in-part of U.S. patent application Ser. No. 10/112,936, filed Apr. 2, 2002, now U.S. Pat. No. 6,905,598, which is a continuation-in-part of U.S. patent application Ser. No. 09/692,203, filed Oct. 20, 2000, now U.S. Pat. No. 6,537,939, which are hereby incorporated by reference in their entirety.

BACKGROUND OF THE INVENTION (i) Field of the Invention

The present invention relates to ceramic water purification devices.

(ii) Discussion of Related Art

Due to worldwide growth in population and industrialization, along with natural disasters, world supplies of safe drinking water are dwindling. Key pollutants that pose a threat to humans via polluted water consumption are pathogens (bacteria and viruses) and organics. Additionally, water resources may contain suspended material, dissolved solids, bacteriological contaminants, and biological contaminants. Conventional water filters are commonly used in American households to remove water impurities and provide cleaner, more aesthetically pleasing drinking water.

However, there are many disadvantages that make these filters difficult to use, especially in developing countries. Typically, such filters are expensive, bulky, difficult to install and replace, and cumbersome to use. Further, most filters available in the United States are not designed to remove pathogens because it is assumed that the water is pathogen free. With regard to available earthenware, most earthenware products are not porous enough to be adequately permeable to water or, if they are permeable, the water flow rate through them is too small to make them practical as water filters.

A number of ceramic water filters are known in the art, these filters typically are composed of clay and sawdust (which is thought by some to turn into charcoal when fired). For example, in the early 1980s, Fernando Mazareigos developed a porous clay filter for the Central American Research Institute for Industry (ICAITI). Since its development, this filter has been introduced and promoted in Central and South America. The body composition of Mazareigos' filter is 50% dry clay and 50% dry sawdust, by volume, of between 35 mesh and 60 mesh.

The ceramic water filters known in the art do not make use of porous grog. As such, they have a disadvantage of having a lower permeability. A further disadvantage of filters known in the art is that, in order to achieve an appropriate flow rate, their lower permeability requires that their size be larger. Larger filters have a disadvantage of being more susceptible to breakage which makes shipping from an efficient central production facility difficult and often requires that such filters be created at the site of intended use.

As such, there exists a need for a method of filtration which is inexpensive, relatively simple to manufacture, utilizes readily available components and, yet, still provides adequate water filtration. There also exists among earthenware products a distinct need for a composition which can provide the earthenware with an increased permeability and thereby allow smaller, less breakable filters with appropriate flow rates.

SUMMARY OF THE INVENTION

The present invention provides for a ceramic water purifying device. In one aspect, the device comprises a silver treated packed particle bed. The packed particle bed may include bisqued pottery grog or grog made from a burn out material mixed with clay. The packed bed may also include expanded shale or a feldspar grog. In one embodiment, the packed bed includes a back-flush bed. The silver may be silver nitrate.

In another aspect, the device comprises clay and feldspar. In one embodiment the clay to feldspar ratio is 30 to 70. In another embodiment, the clay to feldspar ratio is 20 to 80. The device is fired to a temperature of about 1000° C. to 1150° C. In one embodiment, the feldspar particles are between about 40 and 60 mesh.

In yet another aspect, the device comprises clay and bottle glass. In one embodiment the device comprises 50% clay and 50% bottle glass. The device is fired to a temperature of about 680° C.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 20 illustrates the candle dies and spindle for use with the press shown in FIG. 19.

FIG. 21 illustrates the steps in pressing candles using the die and spindle shown in FIG. 20.

FIG. 23 illustrates another two bottle particulate filter system.

FIG. 24 illustrates a water tower particulate filter system.

DETAILED DESCRIPTION OF THE INVENTION

Figure 1:
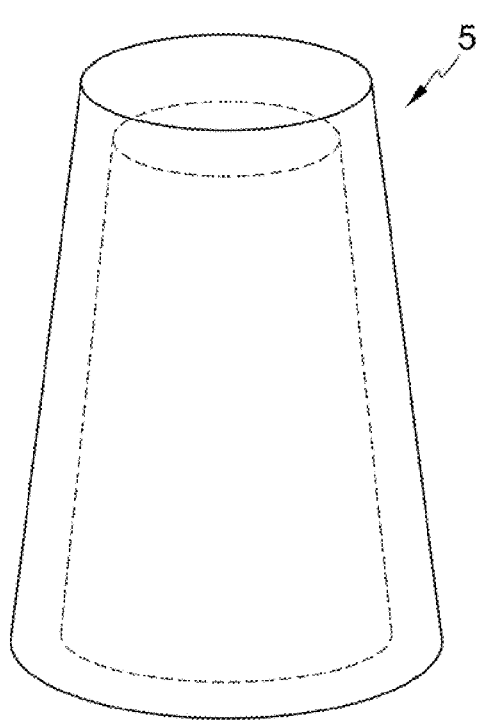
FIG. 1 is a perspective view of an exemplary liquid purification filter embodying the porous grog of the present invention.

The present invention relates to a ceramic water purification device. One embodiment relates to composition for a porous grog (i.e., a very porous, pre-fired clay material). The body composition of the porous grog is a mixture of water, clay and combustible material. The body is fired and the firing causes the combustible material to burn off resulting in a porous earthenware. The porous earthenware may then be crushed to form the porous grog.

Clay, as used in this invention, means any fine-grained, firm earth material that is plastic when wet and hardens when heated. The clay utilized by the present invention is plastic and moldable when mixed with water, retains its shape on drying, and becomes permanently hard on heating or firing, and/or cannot be broken down by water after firing. Non-limiting examples include white clay, clays that fire reddish, (i.e. terra cotta) yellow clay, black clay and combinations thereof. Clays that fire reddish can be found almost anywhere in the world, thus making them a convenient and practical source of clay. Therefore, in an embodiment of the present invention, clays that fire reddish are utilized as the clay in the body composition. Preferably, the clay has a mesh size (i.e., relating to the number of holes per linear inch of a sieve screen) of at least about 10 mesh. More preferably, the clay has a mesh size of at least about 30 mesh. In alternate embodiments the mesh size is 60 mesh.

The combustible material may be any material which burns off during firing to create voids in the earthenware and provide the earthenware with its porosity. Organic materials of plant or animal origin have been found to have properties which provide suitable burn off during firing. Examples of combustible material include, but are not limited to, grain flour, sawdust, sorghum, rice flour, rice husk, millet husk, milled corn cobs, or a combination thereof. In particular, grain flour is a preferred combustible material. Wheat flour is widely prevalent as an inexpensive resource. Thus, in an embodiment of the present invention, wheat flour is used as the combustible material. Preferably, the combustible material has a mesh size from about 100 mesh to about 650 mesh. More preferably, the combustible material has a mesh size from about 250 mesh to about 450 mesh, Most preferably, the combustible material has a mesh size of about 350 mesh.

The amount of water, clay and combustible material utilized in the mixture will vary depending upon the amount of porous grog sought and the desired permeability of the porous grog. Generally, in a preferred embodiment, the amount of clay added to the mixture is about 40% to about 80% by weight and the amount of combustible material utilized is about 20% to about 60% by weight. In a more preferred embodiment, the amount of clay added to the mixture is about 50% to about 70% by weight and the amount of combustible material utilized is about 30% to about 50% by weight. In a further preferred embodiment, the amount of clay is about 60% by weight and the amount of combustible material is about 40% by weight. In a most preferred embodiment, the amount of clay is about 63% by weight and the amount of combustible material is about 37% by weight. The amount of water utilized is at least the amount necessary to sufficiently allow a uniform mixing of the clay and combustible material. However, not so much water should be added that the clay particles pull together, which cuts porosity.

In a preferred method of mixing together the clay and combustible material, water is first mixed with the clay. In an embodiment of the present invention, the clay and water combination is then allowed to stand for about zero to about 24 hours to permit the combination to become sufficiently plastic. In another embodiment of the present invention, the clay and water composition is then allowed to stand for about zero to about six hours to permit the combination to become sufficiently plastic. In a preferred embodiment, the clay and water combination is allowed to stand for about 1.5 hours to about 4.5 hours. In a more preferred embodiment, the clay and water combination is allowed to stand for about three hours. In another embodiment, the amount of time the clay and water composition is allowed to stand depends on the water content of the combination. In this embodiment, the higher the water content the less time is required before the combination is sufficiently plastic. When the clay and water combination is considered to be sufficiently plastic, the combustible material is mixed into the clay and water combination. Mixing alternated with size reduction by breaking the larger particles is helpful to ensure uniform distribution of the combustible material throughout the clay and water mixture. Following mixing, the mixture may be spread out to dry until it has the correct moisture content for pressing. In a preferred embodiment of the present invention, the mixture may be pressed into a form or forms conducive to efficient firing, the fire circulating within close proximity of the grog ware. For example, in one preferred method, the mixture is spread out and allowed to dry until the moisture content of the mixture is less than about 15% by weight. In a more preferred method, the mixture is spread out and allowed to dry until the moisture content of the mixture is about 8-10% by weight. The mixture is then dry pressed into forms or shapes which are conducive to efficient firing, the fire circulating within close proximity of the grog ware. In a preferred embodiment, the dried mixture is pressed into a cylindrical mold, released from the mold and then fired. It has been found through experimentation that disk shapes facilitate stacking in a kiln and allow uniform exposure to heat.

After the body composition of water, clay and combustible material has been properly mixed but prior to firing of the composition or disks, it may be necessary for the composition or disks to be allowed to dry to a moisture content appropriate for firing. Preferably, the composition or disks are allowed to dry for about zero to about four days. More preferably, the composition disks are allowed to dry for about two days.

Grog can also be processed out of particulate, recycled purifier material. This allows a normal percentage of reject candles, implicit to the production process, to be crushed then sized as the appropriate grog material. Thus the grog of recycled candles can comprise 0 to 100% of a subsequent purifier production batch.

Firing is a technique and procedure well known to those skilled in the art. For example, the disks may be fired in a kiln or other similar pottery oven. Kilns and firing technology are well known to those of skill in the art and are well described in literature such as The Kiln Book, Materials, Specifications and Construction, by Frederick Olsen (Chilton Book Co., second edition, 1983).

Firing begins slowly at a preliminary firing temperature, especially through the ignition point, between about 500 to 600° C., The preliminary firing temperature is a temperature at least great enough to burn off the combustible material but not proceeding through this 500 to 600° C. range so quickly as to cause the grog disks to bloat and/or break. If grog breaks up to a particulate during the firing, then the inner most portion of the grog pile will not have received the correct firing temperature. Thus, the under fired grog material will be shrinking slightly, during subsequent, purifier firing. This may inhibit optimal flow rate. The bloating or breakage that occurs at these firing temperatures above the preliminary firing temperature inhibits the unique porosity characteristics exhibited in the resultant fired porous grog of the present invention and is in contrast to the objects of the present invention. If grog breaks up to a particulate during the firing, then the inner most portion of the grog pile will not have received the correct firing temperature. Thus the under fired grog material will be shrinking slightly, during subsequent, purifier firing. This may inhibit optimal flow rate. After the combustible material has burned off, the firing may be allowed to proceed at a rapid pace to a temperature higher than the preliminary firing temperature, up to 800° C. or greater, to the maturation temperature of earthenware, about 1000 to 1050° C.

Firing continues until the body matures into earthenware and/or until the disks or compositions can no longer be broken down by water. Maturing temperatures and times typically depend upon the properties of the specific kiln, pottery oven or firing device used. However, such properties are usually easily ascertainable by a user and determining the maturing temperature and time particular to a specific firing device does not require undue experimentation by one skilled in the art. Additionally the maturing temperatures depend upon the filter medium, and whether this is monolithic or particulate. Generally, a sufficient temperature not to be broken down by water is at least about 500° C. and the composition or disks will be fired for at least about three hours. For example, a standard cylindrical red brick kiln is described in An improved Bonfire by the Organization Intermediate Technology of Kenya. Using such a kiln, the mixture should mature into earthenware after about four to six hours of firing at temperatures up to about 700° C. Following firing, the earthenware is crushed to create granules of porous grog. As the combustible material has been burned off during the firing, the granules of porous grog will contain voids, spaces or air pockets. Maturing temperatures and times also typically depend upon properties of the particular clay material. For example, in an embodiment of the present invention, the maturing temperature and times for the clay material depend upon the amount of iron contained in the clay material. In this embodiment, a higher amount of iron results in a lower maturing temperature and vice versa.

In another embodiment, the porosity of a subsequent grog powder may be enhanced by the grog material being fired a second time prior to granulation. In this step there is a popping effect through the expansion of the clay particles or chunks, analogous to the popping of popcorn, when heated. Following granulation of this material, the ensuing powder has an increased internal surface area.

The grog may be used to form water purification filters. These filters may be either monolithic or particulate purifier filters. Monolithic filters are solid filter elements. The monolithic filter may comprise grog and clay fused together through firing or sintering in a kiln. Such fusion brings about what is referred to as spot welding between particles by those of skill in the art, thus bringing about the solidity of the filter element. The monolithic filters may be formed into appropriate shapes such as disk shaped, candle shaped, or any other shapes.

Particulate filters may initially consist of grog, which is made from a pottery substrate, such as broken, bisque pottery, or porous brick. This is comprised of larger pieces or larger particles of pottery, which is silver nitrate treated and subsequently fired, to burn off the nitrate. The fired material is then granulated, and this may or may not indicate the only firing step for the subsequent grog material. Alternatively, the silver treatment takes place after the granulation, then there is an additional firing, to burn off the nitrate. Whereas the monolithic filters are held together by the spot welding which is implicit to the firing process, the particulate filters are held together by some kind of container. The force of gravity holds the materials in place. Such containers may be plastic, concrete, metal, or another material.

Particulate filters may be made from grog that is made using a burn out material, mixed in with clay. Such material as wheat flour, or another fine grained material can be suitable. The particulate filters may also be made with expanded shale. Expanded shale is made from shale rock that has been crushed to size, then fired in a rotating rotary kiln. The expanded shale, once fired to a high temperature, bloats. Thus there is a lot of internal surface area. A high feldspar grog may also be used.

The contact of particles within the filtration system is much the same for both monolithic and particulate systems, the spot welding implicit to the monolithic system and the containment compelling the contact for the particulate system.

The present invention further relates to a water purification filter that can be made using the porous grog. The unique permeability characteristics of the porous grog provide the filter with a greater flow rate than other known earthenware filters while still maintaining a pore size small enough to remove about 99% of particles of all sizes down to about 1.0 micron. One reason that the porous grog improves the permeability is that the clay material of the present invention is generally "damp pressed" (i.e., pressed with a relatively low water content). Because the clay material has a low water content, the particles are pushed apart by a kind of friction. By contrast, the clays of higher water content are popularly used for throwing and hand building ceramics and are described as moist clays of up to around 25 to 30% water content. For these moist clays, the particles are pulled together more tightly and the water flow rate through the fired clay material is thereby inhibited.

To produce the monolithic water purification filter, porous grog is mixed with water, clay and combustible material. This mixture is pressed in a set of dies, removed and fired to create an earthenware water purification filter. In a preferred embodiment, upon removal from the mold, the water purification filter is cleaned of any seams resulting from the set of dies and may also be burnished (i.e., the surface of the filter may be smoothed by rubbing with a hard object to give a finish with a smooth effect). It has been found through experimentation that burnishing the filter improves the surface strength of the filter.

As with the body composition of the porous grog, the clay of the water purification filter may be any fine-grained, firm earth material that is plastic when wet and hardens when heated. Additionally, as in the clay of the body composition of the porous grog, the clay utilized in the filter is plastic and moldable when mixed with water, retains its shape on drying, and becomes permanently hard on heating or firing. The clay utilized to make the water purification filter may be of the same type and size as that used in the porous grog. However, the clay utilized in the body composition of the water purification filter does not necessarily have to be of the same type and size as that used in the porous grog. In a preferred embodiment, clays that fire reddish are utilized in the body composition of the water purification filter.

As with the body composition of the porous grog, the combustible material may be any material which burns off during the firing of the filter leaving a plurality of spaces, voids or air pockets. The combustible material utilized to make the water purification filter may be of the same type and size as that used in the porous grog. However, the combustible material utilized in the body composition of the water purification filter does not necessarily have to be of the same type and size as that used in the porous grog. In a preferred embodiment, the combustible material is of plant or animal origin. In a further preferred embodiment, the combustible material is grain flour. Wheat flour is available almost everywhere in the world. In addition, wheat flour has proven effective in achieving a good flow rate. Thus, in an even further preferred embodiment, the combustible material is wheat flour.

In the production of purifiers the composition ratios of the clay, porous grog and combustible material will vary depending upon the resultant filter permeability desired. In a preferred embodiment, the composition contains between about 30% and about 60% by weight of clay, between about 30% and about 60% by weight of porous grog and between about 5% and about 20% by weight of combustible material. In a more preferred embodiment, the composition contains about 45% by weight of clay, about 45% by weight of porous grog and about 10% by weight of combustible material.

The mesh size of the composition components may be varied depending on the attributes of the local clay, the amount of shrinkage of the clay, or the amounts of porous grog and combustible material. Further, the mesh size utilized will be dependent upon the desired resultant permeability of the water purification filter. In a preferred embodiment, the mesh size of the clay and grog is at least about 20 mesh. In a further preferred embodiment the mesh size of the clay and grog may be about 60 mesh. In a more preferred embodiment, the mesh size of the clay and grog is at least about 30 mesh.

In the grog production, preferably, the combustible material should be of a very fine grain so that the combustible material will burn off during firing and leave a plurality of voids which improve the permeability of the filter. In a preferred embodiment, the combustible material is from about 100 mesh to about 650 mesh. In a more preferred embodiment, the combustible material is from about 250 mesh to about 450 mesh. In an even more preferred embodiment, the mesh size of the combustible material is about 350 mesh.

Preferably, the percentage by weight of water added is not so excessive as to inhibit good flow. In a preferred method, the mixture, following mixing, may be allowed to dry to a water content of about 25% or less by weight before the mixture is pressed. In a more preferred method, the mixture, following mixing, may be allowed to dry to a water content of about 8 to 15% by weight before the mixture is pressed. Or in either case the mixture may be mixed at the correct percentage water, without the need for further drying. This "damp press" material of a body containing a relatively low water content by weight is in contrast to the conventional moist clay of a body containing up to about 30% water content by weight and is a factor in the increased permeability of the water purification filter. Preferably, following removal from the set of dies and any optional cleaning or burnishing, the filter is allowed to dry before firing. More preferably, the amount of water added to the mixture prior to pressing is such that, following removal from the set of dies, the filter requires not more than about four days to dry before it is ready for firing. Or the filters can be dried for zero to two days.

Firing of earthenware is a process and technique that is well known to those skilled in the art. Though not required, the filter may be fired using the same procedures, temperatures, firing devices, and time periods as those previously described for the firing of the porous grog. In a preferred method of firing, the temperature is sufficiently high to cause the combustible material of the purifier composition to burn off, the purifier to subsequently mature into earthenware or until the material can no longer be readily broken down by water. Preferably, the firing is at a temperature of at least about 500° C. More preferably, the firing is at a temperature of about 600° C. Even more preferably, the firing is at a temperature of about 700° C. Most preferably, the firing is at a temperature of about 950° C. to about 1100° C. Generally, in a preferred embodiment, the firing will last for at least about three hours to about 24 hours, depending in large part on the size of the kiln.

In another embodiment, flour was used as the combustible material. Following mixing, the water was dried off over a two to four hour period for a final water content of about 15%. When mixing the ingredients, it is preferred that the 63 parts of clay powder is first mixed with the 20 parts water and stored in a closed bag over night, helping to restore some of the plasticity which is lost when a clay powder is drying. Preferably, the clay, flour and water are not mixed together at the same time, to prevent the flour from adsorbing all the water prior to its minimal wetting of the clay.

Following overnight storage in the plastic bag, the 83 parts clay/water was mixed with the 37 parts of flour. The mixture will initially appear white due to the flour adhering to lumps of clay, however as the lumps are worked out the mixture darkens. After working out the lumps the mixture was pushed through a 10 mesh screen, to assist with the removal of the bigger lumps of clay. The mixture is then spread out on a plastic to dry back to approximately 15% water content.

Following the drying, the material is then ready for pressing into grog. Alternatively the material may be stored in a closed bag until needed, however, it is preferably used within 24 hours, A car jack, screw press, or the like, is used to press 1.0 cm, thick disks, appropriate for stacking in the kiln, although any similar device could be used, given that it will provide the appropriate amount of pressure. The grog, was then ready for drying, whether in the open air or in an oven. In the subsequent kiln firing the temperature is raised slowly to prevent bloating and uneven firing which causes the disks to crumble into powder. This would happen in through the range of about 400 to 600° C., the ignition temperature of flour. The burnout of all the flour, is typically indicated by a lot of smoke, and then the kiln may be turned up quickly. Following the firing, the grog disks are then crushed to 10 mesh. While all the strength of a fired earthenware is present, there is less 'spot welding' (the bonding of adjacent clay particles, brought about by firing) so crushing the grog disks is not difficult.

The final composition for the purifier depends to some extent on the clay used. Black clays require less flour than those that naturally occur as red, yellow, and white etc. This is because many black clays already contain a small percentage of organic material (combustible material). In another embodiment where the clay is not black clay the final composition could be 50% grog, 40% clay and 10% flour. The purifiers are pressed then fired, and colloidal silver applied thereafter.

For the purifier composition it should be noted that for black clays by comparison with clays that are not black there is a substantial increase in the rate of flow for only a small additional amount of flour. For example, 37% flour to 63% black clay gives double the rate of flow of the non black clay of the same composition. This means that to get the same rate of flow, as per the composition of the grog, the black clay should contain 30% flour to 70% clay.

In the last step of the forming process for appropriate technology filter candles, to insure the green strength necessary to forming at this stage, it is important to increase minimum water content to about 8% through water of up to 15%, or more is acceptable.

Figure 13:
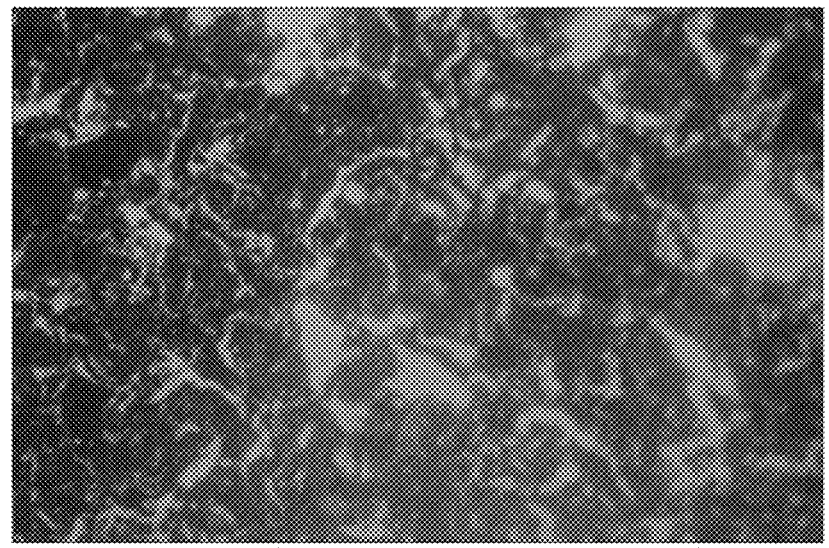
FIG. 13 is a micrograph of the fired purifier medium at 5×.
Figure 14:
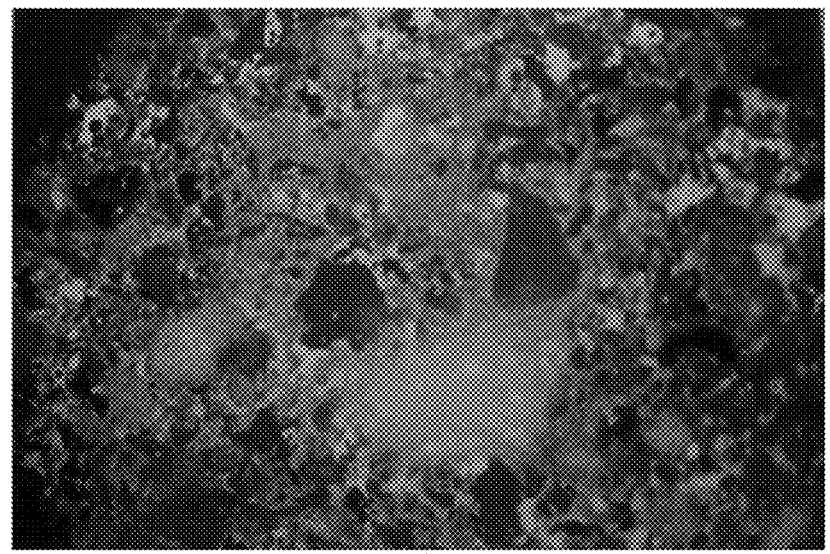
FIG. 14 is a micrograph of the un-fired purifier medium at magnification 20×.

As shown in FIGS. 13 and 14, for permeable grog purifiers, looking under the microscope it is clear that with respect to permeability the filter medium is not entirely homogeneous. The micrographs indicate that permeability varies from clump to clump, or particle to particle within the purifier. The most permeable material is the porous grog, the least permeable the plastic clay necessary in facilitating forming of the resultant porous grog composition. Control over final permeability comes in formulating a mix of materials, an averaging that ends up giving the desired flow, the 1.0 to 1.5 liters per hour necessary to the needs of a small family, assuming a filter of volume about 350 ccs. At the same time, for larger families a filter of 500 ccs will give about ⅔ liters of filtered water per hour. The micrographs indicate in one embodiment the thickness of the pores is as much as about 100 microns, although one will appreciate that the thickness may be varied depending on the combustible material utilized and fabrication of the grog.

As shown in FIG. 13, the micrograph indicates a lot of elongated pores, those primarily involved in bringing about control over the amount of flow. Note that larger white areas indicate pores caused by burnout of a number of combined, grains of flour. Larger dark areas indicate some of the bigger particles of the 10 mesh grog.

As shown in FIG. 14, the red particles indicate the pre-fired grog, the yellow ones, the un-fired clay composition. Larger white particles show pores, where the composition was not fully compacted.

In large part the control over the rate of flow is aided by the proper mixing of particles of different permeability. However, more homogeneity may be considered desirable. The mixture of a plastic clay material with a glutinous bread like material, all with water, would appear to be unlike any other process in ceramics.

In another embodiment, the addition of combustible material would not always be necessary for achieving good flow allowing for simplified fabrication. In this simplified fabrication the grog itself comprises particles that are somewhat separated by their jaggedness. Without being held to the current theory, the applicant hypothesizes that the size and shape of the pores result from the shrinking away that happens between the previously fired and not previously fired particles. This appears to bring about a network of pores that is of primary importance to the permeability.

In another embodiment, 60 mesh sawdust can be used instead of the wheat flour. In another embodiment, brick dust, or particulate brick of approximately 30 mesh, is used in place of grog. In this embodiment the brick dust may be combined with flour, sawdust or similar combustible material in order to get the appropriate candle composition.

In another embodiment, for the appropriate flow rate, permeability may be varied by making changes to the combination of the following, for example: (a) the ratio of flour to clay in the grog composition; (b) the addition of a bit of combustible material (i.e. flour, sawdust, brick dust) in the candle composition (e.g. 50% grog, 40% clay, and 10% flour) and/or, (c) the amount of water used in either the grog or the candle compositions. This could normally be 13% to 20% water, but could be as low as 5% and as high as 35 or even 40%. Furthermore, (d) increased firing temperature will bring about increased flow, and decreased firing temperature will bring about decreased flow.

In another embodiment, the flow rates of disk and candle purifiers may be varied by altering the particle size distribution and by altering the applied pressure. These two variables can be altered individually or as combinations in order to obtain the correct flow rate and residence time. Additionally, the differing designs of disk purifiers and candle purifiers require different considerations for particle size and applied pressure. For example, disk purifiers, at the bottom of the containers, have a larger water column than is true of the candle purifiers. Disk purifiers may typically have 30 to 40 centimeters of water column, while candle purifiers may have an average of 15 to 20 centimeters of water column. For this reason, the candle purifiers need to be more open structured.

An appropriate candle composition may depend on 80% of the grog lying between 30 and 80 mesh, with the remaining 20% composed of sub 80 mesh. This same percentage, particle size distribution holds true for monolithic filters. This ratio gives a good particle packing with smaller particles fitting into the interstices of larger particles. This ratio also helps to bring about a good void size distribution, not so open as to bring about an excessive rate of flow. By contrast, the disk purifier may have all of its grog at sub 80 mesh. The aim is to get a purifier that allows for fifteen to twenty minutes of residence time of pathogens for sustained contact with the silver. However the residence time may be reduced, as appropriately determined by the manufacturer, following appropriate lab work and other testing.

If the disk purifier comprising of grog that is sub 80 mesh has a flow that is deemed too slow, such as if the flow is less than the volume of the disk per 20 minutes, then the applied pressure can be reduced to increase the flow rate. For example, if a purifier that was initially pressed at 6,000 pounds has a flow rate that is too low, then the applied pressure can be reduced to 2,000 or 3,000 pounds to increase the flow rate.

In another embodiment, the flow rate of the purifier is such that the volume of water to pass the filter in twenty minutes is equal to the volume of the purifier. This period ensures the water has the necessary residence time to allow any pathogens in the water to have sustained contact with the silver. There are several ways of controlling flow of flow so as to get the same volume of filtered water per twenty minutes. One is to adjust the particle size, using some mix of tine particles and coarse particles. Thus, the use of coarse particles leads to an increased flow rate, and the use of fine particles leads to a decreased flow rate. Another way of changing the flow rate, so as to get what is desirable, is to increase or decrease the pressure that is applied to the purifier during the pressing. For example, purifiers pressed to 1,000 pounds gives greater flow than those pressed to 6,000 pounds with a linear relationship between the two pressures. Yet another way of changing the flow rate is by firing to a higher or a lower temperature. The maturing temperature of the particular clay will allow a higher flow rate, while a lower temperature will result in a reduced flow rate.

In one embodiment, candle purifiers are formed with an applied pressure of between 1,000 and 6,000 pounds. The pressure is adjusted so that the flow rate would equal the volume of the filter per 20 minutes. For example, a candle filter that is 11 centimeters in diameter by 11 centimeters tall would have a volume of 700 cubic centimeters. Therefore, the flow should be 700 milliliters per 20 minutes.

Non-limiting examples of combustible material that may be added to the present invention include: grain flour, sawdust, sorghum, rice flour, rice husk, rice husk ash, millet husks, milled corn cobs, powdered earthenware which was previously fired, for example brick dust, broken earthenware, and bisque earthenware. It should be understood that these combustible materials may be used alone or in combination with other combustible materials.

Figure 22A:
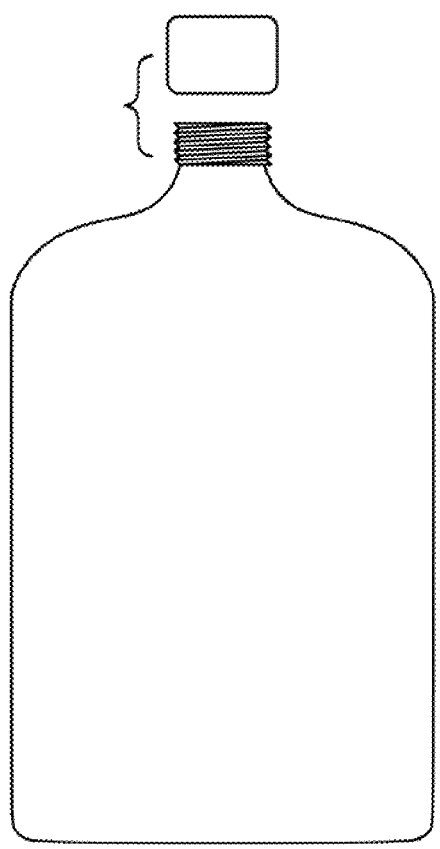
FIG. 22 illustrates a two bottle particulate filter system.
Figure 22B:
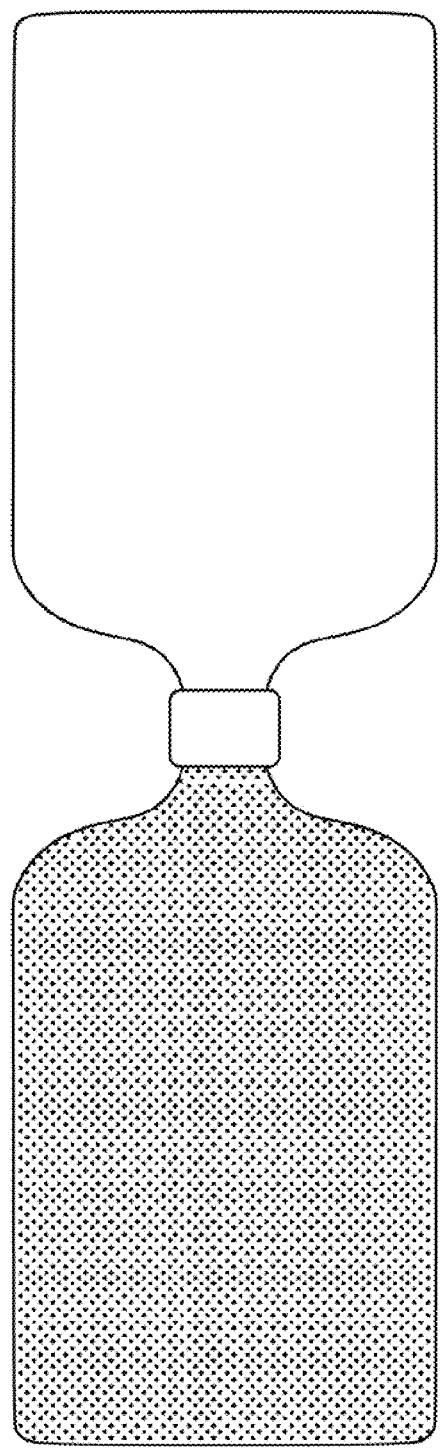
Figure 25A:
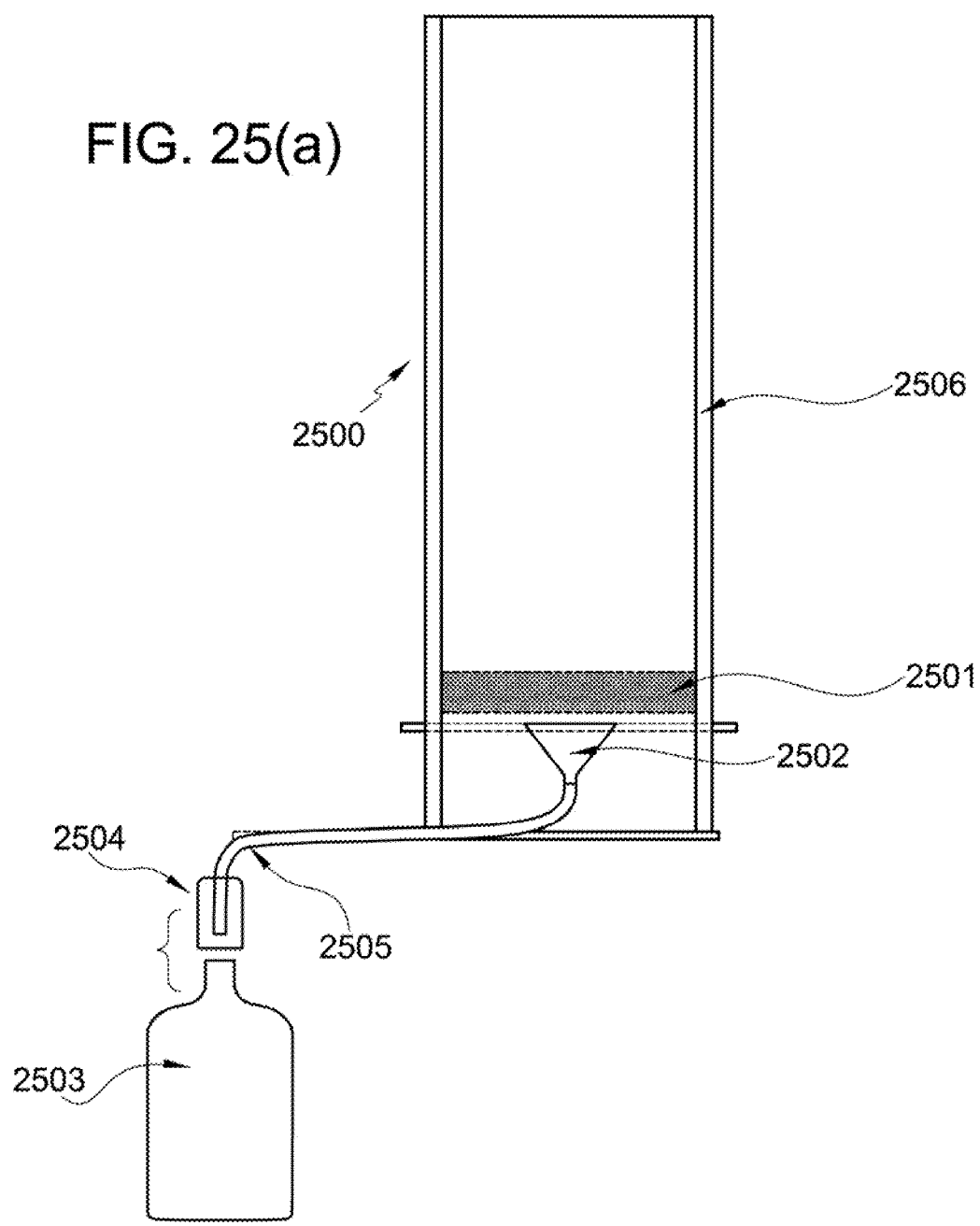
FIGS. 25 (*a*) and (*b*) illustrates a pottery water system.
Figure 25B:
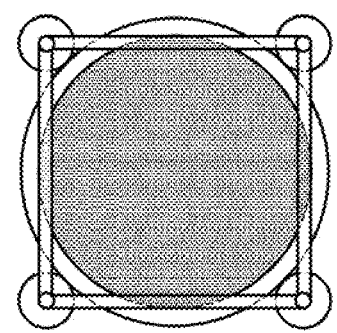
Figure 25C:
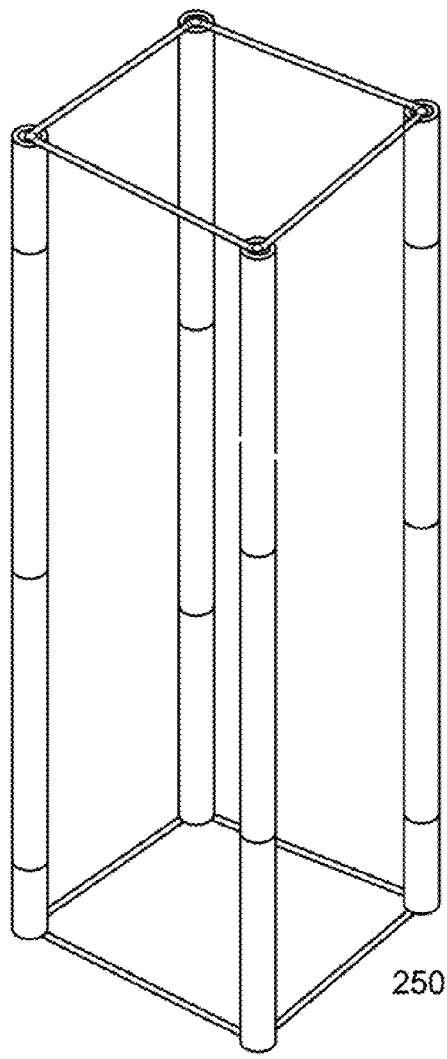
Figure 25D:
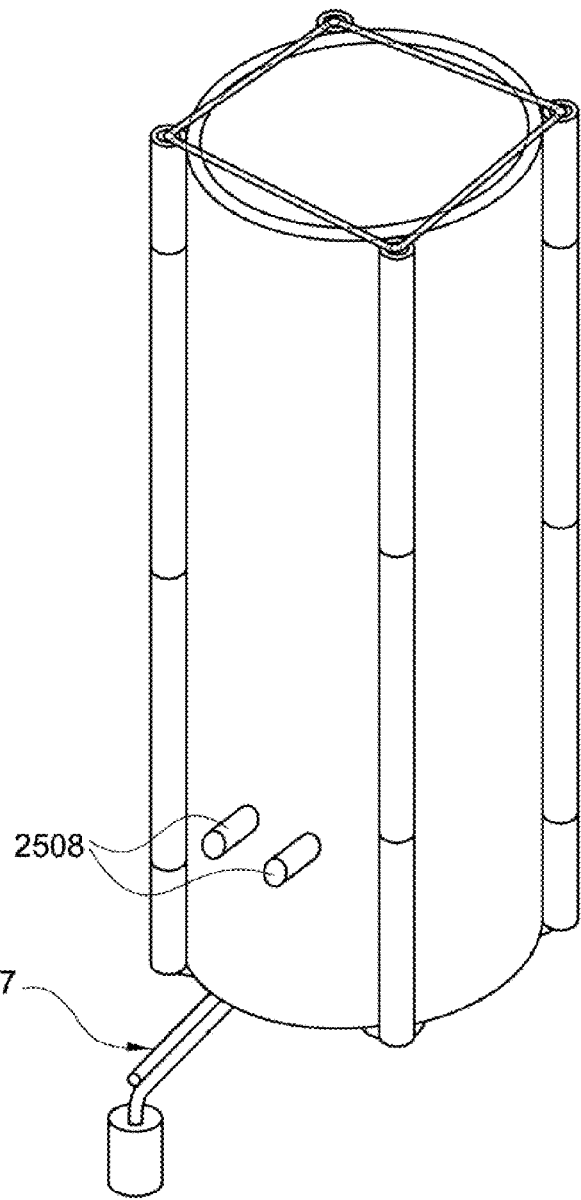

In another embodiment, the filters are particulate filters. The particulate filters may be comprised of clay and grog material held in a container. Ease of scalability is an advantage of the particulate system. System sizes may be as small as those of individual persons or individual households or as big as those of municipal water treatment systems. The sizes can range from the small systems as described up to those of the large systems, the sizes being applicable anywhere within this range. FIGS. 21 and 22 illustrate embodiments of the small systems and FIG. 23 illustrates an embodiment of a large system. Within this range, the containment for the particulate system may be a small plastic, such as PVC, bucket for the individual or small household system up to the size of a concrete container. The containers may also be made of other material. The intermediate sized particulate systems may be appropriate for institutional systems. The large particulate systems may be appropriate for small or large municipalities.

Particulate systems are also well suited to emergency situations and for disaster preparedness in general. A virtue of systems for disaster preparedness is the sustainability and ease of production in almost any location wherever clay is available. A further virtue of such systems is their applicability in public health projects, whether following the period of the disaster or independent of any disaster.

In the embodiment of a larger system, for a community or a small municipality, the container may consist of a water tower, as shown in FIG. 23, which is also referred to as a stand pipe. In this instance, the container of the water tower is normally made out of an iron based metal, or out of wood, or another metal, which is elevated above the community or municipality. The treated grog is in a middle portion of the system, while a lower reservoir contains the purified water, and an upper portion contains the contaminated water. Another embodiment comprises two containers, the upper container contains the contaminated water, with the particulate be beneath this, and the lower container contains the purified water. The containers may be built into a hillside. Thus, the upper reservoir is up the hill from the lower reservoir, and these containers supply purified water to persons who are down hill from the system.

In another embodiment of the particulate system, the upper and lower containers are identical small containers such as shown in FIGS. 21 and 22. For example, two 1-gallon containers can be used such as those with a small neck and cap that screws onto the neck. A connecting fitting for the container allows the two containers to be coupled together. One of these containers is filled, either completely or partially with grog that has been treated with silver or iron oxide, described below. The container is then filled with contaminated water. Thus the water fills the interstices between the grog particles, as well as filling any additional space in that container. After a period of residence time for the pathogens and/or other contaminants within this filtration medium, the empty second container is coupled to the first and the two container system is then turned upside-down. Now free of pathogens, the water flows into the lower container. In the process of this flow, any other contaminants consisting of particles or other inorganic contaminants are removed.

Sizing techniques for the grog are undertaken using crushers and mills, as known to those in the art. Initial sizing is done on a small scale using crushers, mills and sieve screens, such that a range of particle sizes is accomplished in order to give appropriate particle size distribution and void size distribution. Thus the residence time for pathogens within the filtration medium can be optimized.

In another embodiment, a small amount of silver material is applied to the earthenware following firing. This silver material causes an oligodynamic action whereby micro-organisms are starved of oxygen and killed or disabled when they make contact with silver particles, or are in close proximity. The silver material also has an electric charge which can cause the internal protoplasts of pathogens to collapse. Further, colloidal silver can render pathogens unable to reproduce and can kill parasites while in their egg stage. Thus, silver material, when applied to the water purification filter, acts as a disinfectant in addition to preventing regrowth of bacteria within the purifier wall. The silver material may be applied in its colloidal form or as silver nitrate. When silver nitrate is applied, the filter should be fired for a second time, in reduced oxygen at the upper temperature, around 475° C. At this temperature the nitrates to burn off, the reduction promoting a silver metal bond to the ceramic. When colloidal silver is applied, there is not a need for a second firing, the disinfectant being silver oxide. Through experimentation it has been found that amounts of colloidal silver as low as 100 to 200 ppm of silver solution aid effectiveness in providing potable water. Membrane filtration testing for bacteria has shown that the earthenware filter of the present invention when combined with silver material yields purified water with no visible petri-dish bacteria. By contrast, the earthenware filter of the present invention without silver material yields purified water with 20 petri-dish bacterial colonies, depending on initial contamination levels. For example, control filters generally remove only about 80% of e-coli. Membrane filtration testing of the unpurified, raw water used in the earthenware filter tests indicate an uncountable number of petri-dish bacterial colonies.

In an additional embodiment of this invention, a method of depositing silver chloride on the earthenware water filter is disclosed. Further, methods of use of silver chloride as a versatile disinfectant on a wide variety of applications are also disclosed.

Recent lab test results indicate that in order for the porous grog purifier to be 100% effective at removing *Escherichia coli* (*E-coli*), a lot more silver than the 200 part per million (ppm) used for other slower types of filters can be required, especially at increasing flow rates, as for example, by increasing water column height. When the flow rate per surface area is as high as that of the pottery purifier, and at the increased column heights a small percentage of *E-coli* may become dynamic, or at least nimble enough to pass through the porous grog into the filtered water as there is inadequate time for the bacteria to be trapped by the porous grog ceramic as well as insufficient exposure time to the colloidal silver for the oligodynamic reaction to take place.

In order to overcome this problem, one possible approach is to increase the amount of silver in the purifier. It should be noted that colloidal silver (hereinafter "CS") saturation has had widespread use in the production of other kinds of low temperature filters. When the CS dries out within the medium, it leads to silver oxide stuck within the pores of the ceramic. Although colloidal silver is an excellent choice for removing the *E-coli* and other micro-organisms (which may include fungus or parasite, or other species of bacteria such as *Streptococcus faecalis, Legimella pneumophilia, Yersinia enterocolitica. Staphylococcus aureus, Pseudomonas aeruginosa. Klebsiella terrigena* or *Salmonella typhi*), there can be a serious disadvantage from the standpoint of cost. Since CS is imported it tends to be expensive or difficult to acquire. Therefore, it is desirable to be able to produce some other forms of silver compounds, a form that also gives tiny particles.

In an alternate embodiment to the colloidal silver (CS) treatment, a low cost, no heat treatment, room temperature method of applying silver chloride (AgCl) may be performed. Like colloidal silver, silver chloride is a known disinfectant and has been used in combination with other chemicals for the treatment of water. For example, King in U.S. Pat. No. 6,217,892 teaches a regenerative water treatment method using zinc and silver chloride composition. Adachi et al. in U.S. Pat. No. 5,342,528 teach a method of purifying water containing an activated carbon having silver and/or an inorganic silver compound and an alkaline earth metal salt.

Figure 5:
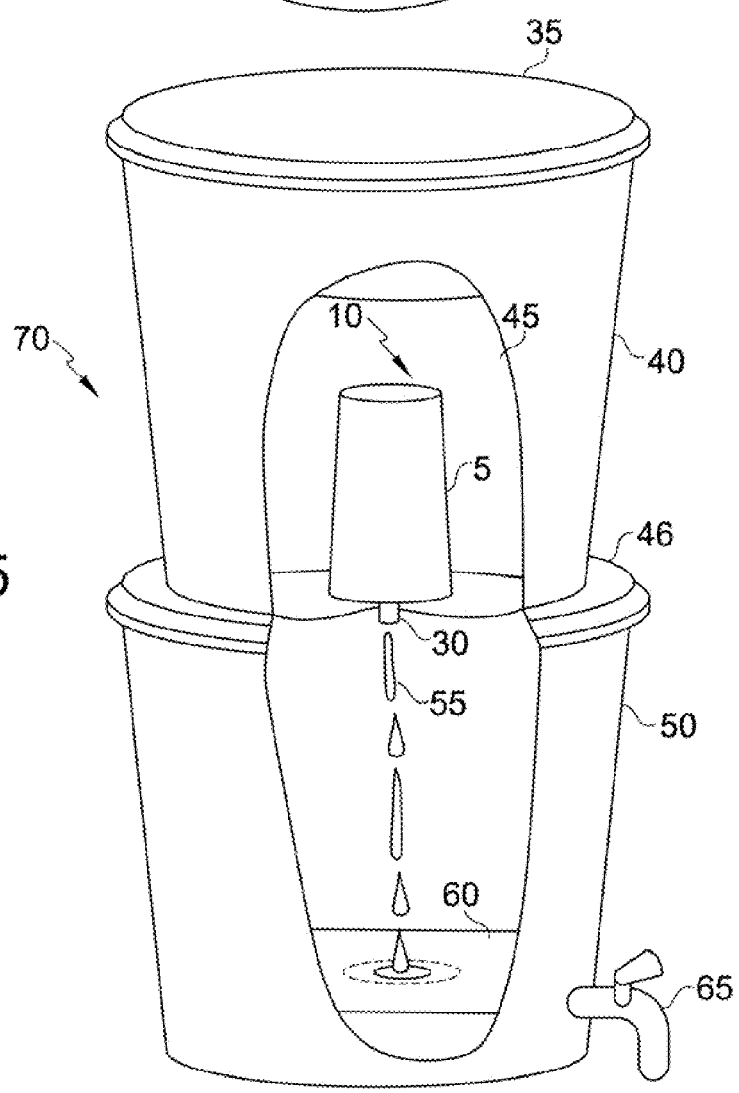
FIG. 5 is a perspective view, with portions in section, of an exemplary liquid purification system incorporating the liquid purification device of FIG. 3 and FIG. 4.

While the use of silver chloride as a disinfectant is old in the art, its method and use in the porous grog pottery purifiers represent a novel application in producing disinfected water to the rural poor at a very low-cost. The water disinfection treatment of this embodiment comprises a method of depositing silver chloride particles into the porous grog ceramic purifier. The method involves finding a good quality, silver-free, porous grog ceramic purifier, saturating it with silver nitrate (AgNO3) and then drying it. After inserting these silver nitrate candles into the two-tiered purifier system as illustrated in FIG. 5, the upper container is filled with saturated salt water (NaCl). Thus, running salt water through the candle leads to the deposition of silver chloride (AgCl) into the ceramic, while the nitrate salt (NaNO3) is flushed away in the following reaction: AgNO3+NaCl—AgCl+NaNO3. This method replaces soluble silver nitrate with a relatively insoluble silver chloride. Further, the method does not involve subsequent firing unlike the method of depositing colloidal silver by heating AgNO3 described in an earlier embodiment. (It should be noted that silver chloride has a solubility of 8.9×i0 grams per 100 cc in cold water. By way of comparison, one form of silver oxide has a solubility of 1.3× i0 grams per 100 cc in cold water).

For the current purifiers with AgNO3 and AgCl treatments, some forty membrane filtration tests have indicated that these alternatives should be highly effective toward *E-coli* removal. In the case of silver chloride candles, thirty were tested, and all indicated 100% removal of *E-coli*. Eleven candles were tested as control purifiers, containing no silver, and nine of these were not 100% effective. The average *E-coli* removal rate for these nine candles was 98%. These figures are illustrated in the table below.

TABLE 1

| A. | B. | C. | D. |
|---|---|---|---|
| AgCl from 0.5 grs. AgNO3 100% removal of *E-coli* | AgCl from 0.44 grs. AgNO3 100% removal of *E-coli* | AgCl from 0.25 grs. AgNO3 100% removal of *E-coli* | No Silver Control 0 grs. AgNO3 98% removal of *E-coli*. |

For the four groups of purifiers A through D, the expected flow rate per candle is about 1.5 liters/hr. Because the process of "A" involved too high a cost due to too much silver, the process was proceeded with further testing with lower concentrations of silver. The results of purifiers "B" and "C" showed a sufficiently low cost of silver per purifier, which still indicated 100% effective removal of *E-coli*. The control group of purifiers "D," without any AgCl showed that it was only 98% effective in removal of *E-coli*. Also, a 100% removal of *E-coli* was found with two groups of purifiers containing both silver chloride and colloidal silver. Additionally, these purifiers have the advantage of a low cost of production, wherein the cost of the silver per purifier come to only about US $0.03.

In another embodiment, removal of viruses and metals, such as arsenic, may be accomplished by using a form of $Fe^{3+}$ in the grog. Such forms of $Fe^{3+}$ include hematite, goethite, yellow ochre, and red mud. In the firing of the filters of a $Fe^{3+}$ composition, the preferred embodiment is a composition of 14% $Fe^{3+}$ and 86% pottery clay, with the pottery clay being a terra cotta color or other light colored firing clay. Other embodiments include compositions that are within a few percentage points each of the 14% $Fe^{3+}$/86% clay. Thus the other percentages such as 10% and 18% $Fe^{3+}$ to 90% and 82% pottery clay respectively are suitable. In other embodiments, the clay is not earthenware, but a higher firing clay, such as stoneware. The colors of the clay for the earthenware or stoneware clays may range from a darker terra cotta to a light colored firing clay. In another embodiment, the clay does not fire to a terra cotta or light color but rather is a white color, such as is the case for porcelain clay.

In another embodiment, a pottery water storage container is fired to 600° C., as per the simplified technology of rural, village potters. The technology of producing such containers is traditional in many countries of sub-Saharan Africa, South and Southeast Asia, as well as South America. Such containers are preferred by those who use them because of the cooling effect of when air currents blow against the damp, outer surface of the container. However, the porous inner surface of such containers are a breeding ground for pathogens. In order to remediate this problem, a single brush stroke of dilute silver nitrate is applied to the entire inner surface of the dried, unfired pottery container. When this container is fired to approximately 600° C., as per the village pottery technology, the nitrate is burned off, leaving some mix of silver metal, silver oxide and silver hydroxide. These forms of silver act as disinfectant, effectively preventing the growth of pathogens. The pathogens are killed or disabled on contact with these forms of silver.

In a similar manner, the village potter may use hematite or some form of $Fe^{3+}$ as a constituent of the pottery composition for pottery water storage containers. As described earlier with embodiments of $Fe^{3+}$ filters, this form of $Fe^{3+}$ gives a container in which the $Fe^{3+}$ acts as a substitute for silver in killing or disabling pathogens. Additionally, the $Fe^{3+}$ rich interior wall of the container prevents the presence of viruses and other pathogens.

In another embodiment to the method of silver chloride disinfection of porous grog purified water, an elementary particulate grog purifier may be created with crushed red-brick particulates substituted for the porous grog, especially where a porous grog purifier system may not be readily available such as in a disaster-stricken area, where there is an urgent need for clean and disinfected drinking water. Red brick is commonly available in many parts of the world, which is inherently porous and can be a good substitute for the kiln fired porous grog.

The method of preparing the particulate purifier, by comparison with a solid purifier is described below:

Thus, this elementary simplified version of the particulate grog purifier units may be constructed without the need for kilns or any other substantial investment. Preferably the red brick chosen for this simplified version has good strength and porosity. While porous grog is superior for purifying water, red brick grog would be made readily available as it does not need subsequent firing, and therefore is a low cost substitute for delivering water to the disaster-stricken victims. In alternate embodiment, the red-brick grog may be substituted or mixed with porous grog particles of 10-100 mesh, In alternate embodiment, the container may comprise of pottery, plastic or metallic containers such as aluminum, steel, copper or brass.

Figure 26:
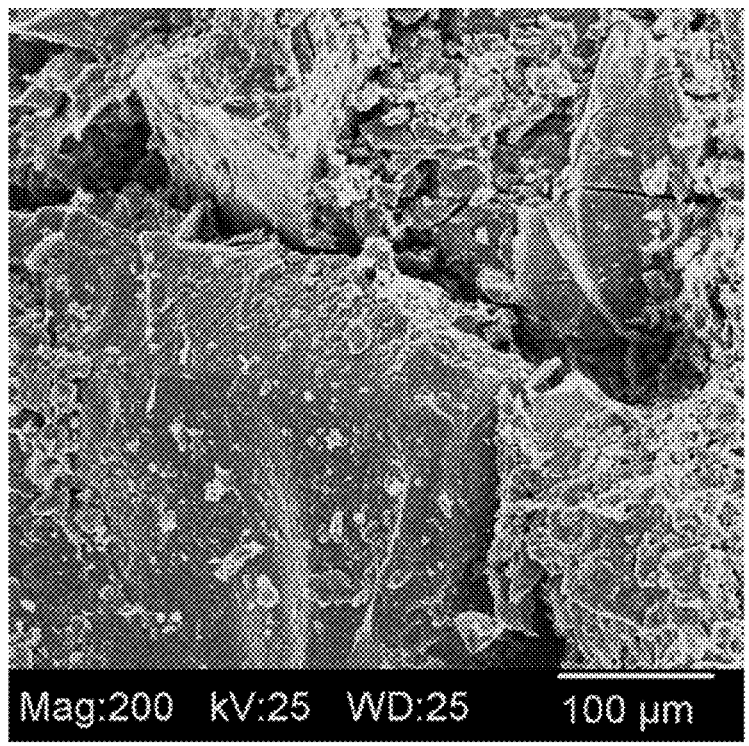
FIG. 26 is a micrograph of a purifier medium fired at 1090° C.
Figure 27:
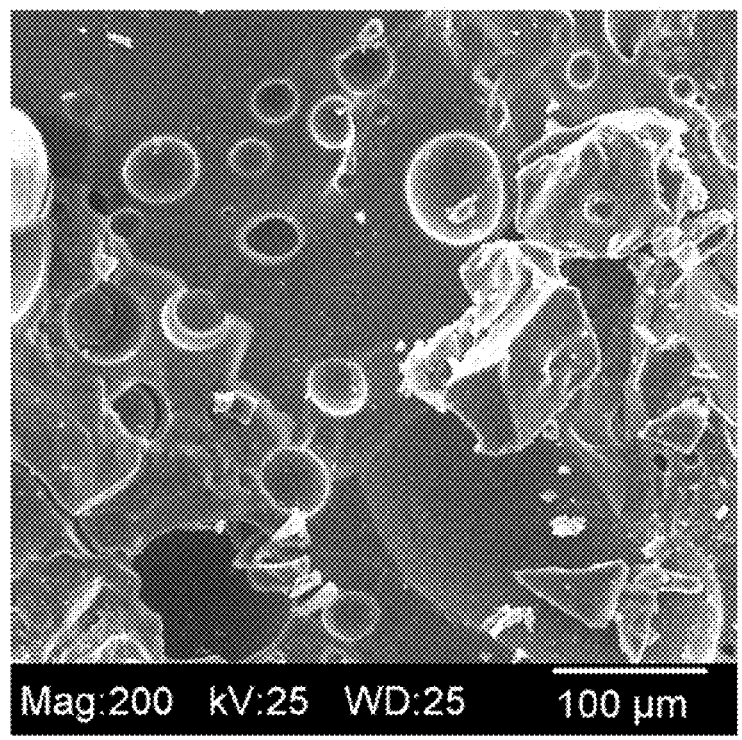
FIG. 27 is a micrograph of a purifier medium fired at 1230° C.

In another embodiment of the ceramic water purifier device, the filter may be made with clay and feldspar. In one preferred embodiment, the filter comprises a clay to feldspar ratio of 30 to 70. In another preferred embodiment, the filter comprises a clay to feldspar ratio of 20 to 80. The clay/feldspar filter may be fired at a temperature to yield a desired flow rate. As shown in FIG. 26, the micrograph of a 20/80 clay/feldspar filter fired to 1090° C. shows that the walls of some voids are visible as well as a fissure. The microstructure is open, allowing for a great deal of flow. As shown in FIG. 27, the micrograph of a 20/80 clay/feldspar filter fired to 1230° C. shows that the structure is entirely closed and vitrified. In one embodiment, the 20/80 clay/feldspar filter is fired to 1150° C.

Table 1 shows the bulk properties of 20/80 clay/feldspar filters fired to different temperatures.

| | Dry Wgt. | Suspended Wgt. (g) | Saturated Wgt. (g) | Volume (cm³) | Open Pores (cm³) | Impervious Portion (cm³) | Porosity (%) | Water Adsorption (%) | Specific Grav. | Density (g/cm³) |
|---|---|---|---|---|---|---|---|---|---|---|
| 1000 C Sample ID | | | | | | | | | | |
| 80 Feldspar/20 Clay | 7.13 | 3.9 | 7.9 | 4.00 | 0.7675 | 3.2325 | 19.2 | 10.8 | 2.2065 | 1.78 |
| 80 Feldspar/20 Clay | 16.20 | 9 | 18.1 | 9.10 | 1.9000 | 7.2000 | 20.9 | 11.7 | 2.2500 | 1.78 |
| 80 Feldspar/20 Clay | 34.10 | 18.9 | 37.9 | 19.00 | 3.8000 | 15.2000 | 20.0 | 11.1 | 2.2434 | 1.79 |
| 80 Feldspar/20 Clay | 18.90 | 10.4 | 21.2 | 10.80 | 2.3000 | 8.5000 | 21.3 | 12.2 | 2.2235 | 1.75 |
| Average | | | | | | | 20.3 | 11.5 | 2.2 | 1.8 |
| 1100 C Sample ID | | | | | | | | | | |
| 80 Feldspar/20 Clay | 22.60 | 11.9 | 23.8 | 11.90 | 1.2000 | 10.7000 | 10.1 | 5.3 | 2.1121 | 1.90 |
| 80 Feldspar/20 Clay | 23.18 | 12.56 | 24.16 | 11.60 | 0.9800 | 10.6200 | 8.4 | 4.2 | 2.1827 | 2.00 |
| 80 Feldspar/20 Clay | 29.00 | 14.82 | 30.2 | 15.38 | 1.2000 | 14.1800 | 7.8 | 4.1 | 2.0451 | 1.89 |
| 80 Feldspar/20 Clay | 37.60 | 19.8 | 39.5 | 19.70 | 1.9000 | 17.8000 | 9.6 | 5.1 | 2.1124 | 1.91 |
| Average | | | | | | | 9.0 | 4.7 | 2.1 | 1.9 |
| 1150 C Sample ID | | | | | | | | | | |
| 80 Feldspar/20 Clay | 20.00 | 10.3 | 20.5 | 10.20 | 0.5000 | 9.7000 | 4.9 | 2.5 | 2.0619 | 1.96 |
| 80 Feldspar/20 Clay | 19.10 | 9.8 | 19.5 | 9.70 | 0.4000 | 9.3000 | 4.1 | 2.1 | 2.0538 | 1.97 |
| 80 Feldspar/20 Clay | 28.80 | 14.7 | 29.3 | 14.60 | 0.5000 | 14.1000 | 3.4 | 1.7 | 2.0426 | 1.97 |
| 80 Feldspar/20 Clay | 33.50 | 17.6 | 34.3 | 16.70 | 0.8000 | 15.9000 | 4.8 | 2.4 | 2.1069 | 2.01 |
| Average | | | | | | | 4.3 | 2.2 | 2.1 | 2.0 | a) Locating some good quality, red brick;
b) Crushing said red brick to about 30 mesh (which could be jobbed out to an agricultural hammer mill);
c) Placing the crushed grog into a container and saturated it with silver nitrate salt about 1 mg per 1.0 cc of particulate grog;
d) Drying the particulate grog on an open surface in subdued light;
e) Pouring the dried silver nitrate AgNO3 saturated grog into said container filled with salt water resulting in deposition of AgCl on the grog particulate;
f) Running tap water through this purifier unit to flush away any remaining salt and readying it for use.

As temperature increases porosity decreases. During the firing of the feldspar filter, the particles bond to adjacent particles in such a way that the structure becomes more and more closed. In turn, the relative density increases with temperature increase. Additionally, water adsorption and open pores will decrease with increasing temperature due to the closed-pore network.

In one embodiment of a filter having a high percentage of feldspar, the feldspar particles are between 40 and 60 mesh.

Other parameters may also influence the rate of water flow, such as the amount of force applied during the forming process.

In another embodiment of the ceramic water purifier device, the filter may be made with clay and bottle glass. In one preferred embodiment, the filter is 50% clay and 50% bottle glass. The resultant glassiness bears similarities to that of the feldspar filter, which is also glassy. The bottle glass filter may be fired at a very low temperature. In one embodiment, the bottle glass filter is fired to 680° C. The necessary kilns to fire to 680° C. can be built out of common construction brick, without the need for expensive refractories and kilns. The high tech refractory kilns tend to be used to fire to substantially higher temperatures.

Figure 28:
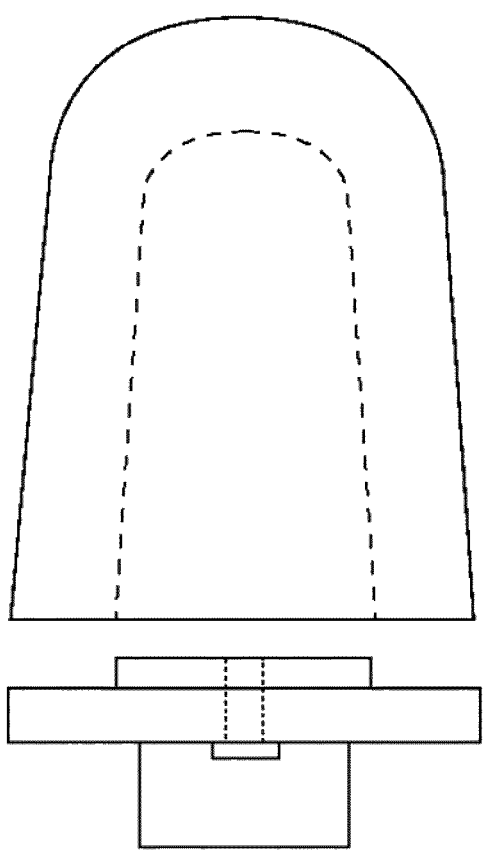
FIG. 28 a cross-sectional side view of a jiggered candle filter.

In another embodiment, a monolithic filter is made by jiggering, a ceramic forming process that is well known in the art. FIG. 28 shows a sectional view of a jiggered candle, the area within the dotted lines representing the interior of the candle. The candle shown is formed through a turning process, wherein a template cuts away excess clay.

The dotted line also indicates the space that is occupied by a tapered spindle, which, in this case is a form that represents the interior of the candle. At the beginning of the forming of the jiggered candle, the tapered spindle is covered with the clay composition of the candle. Then a template is used, spun around the spindle (from a topward view). During this forming process the excess clay is cut away from the candle, leaving a smooth surface.

It should be understood that the word candle has a broad definition, since candle filters have normally been thought of as being round cylindrical. By contrast the jiggered candle, as indicated, is largely a conic section, which is tapered, also referred to as a round frustum. The top end of this candle filter consists, approximately, of a hemispherical end cap, as indicated in the sectional drawing.

By contrast to the damp pressed clay composition of prior embodiments, the clay composition of the jiggered filter is referred to in the art as a moist clay, and is approximately 25% water. By contrast the damp pressed filters of prior embodiments have a water content in the range of 8.0% to 15.0%, and as mixed this damp pressed clay material has some resemblance to a powder.

By comparison, a moist clay composition is more familiar to those in the arts, such as in the process of wheel throwing tableware, or the forming of other ceramic ware. It is such moist clay, with water content around 25%, that is placed over the tapered spindle of the jigger, prior to the forming process.

Jiggering has several advantages by comparison to other moist clay forming methods. For example, another choice in the forming of a moist clay composition is extrusion. However, by comparison with the filter element that's formed by extrusion, the jiggered filter is formed with a minimal number of seams, such as those that are implicit to the design of extrusion.

A typical extrusion filter would have approximately five seams, and this number could well allow for a faster flow rate at each seam. Thus, E coli and other pathogens could more readily get into the filtered water through such seams.

The jiggered filter of this embodiment uses a 50/50 ratio of grog to clay, which is similar to that of the prior, damp pressed filters. However, the grog of the jiggered filter is much more coarse. The grog may be thought of more as a granulate than as a particulate, and this material falls between 8 mesh and 10 mesh. Thus it takes about ten granules to span the distance of the 2.5 cm. (1.0 inch) wall thickness.

As is the case with the damp pressed filters, of prior disclosure, the clay of the composition pulls away from the grog, during the processes of drying and firing. In the case of the larger granules of grog, however, the space between the grog and the clay is greater, and this allows for a greater rate of flow.

As with prior embodiments the clay composition can then be fine tuned, down to a point at which the flow rate is as desired. For example, the flow rate may initially be excessive, suggesting that the E coli will not have had adequate residence time, in sustained contact with the silver.

In this case the parameters may be adjusted, so as to get the desired flow rate. As examples such changes may be made as, 1. by reducing the size of the granules of grog, so as to reduce the space between the particles of the grog and those of the clay, or, 2. by adding some percentage of a fine grog into the clay portion of the composition.

Although the main embodiments of this present disclosure comprises the alternative method of silver chloride disinfection of the porous grog water purifier device, this method of sanitation may be adaptable and applicable to treat and disinfect several other areas where hygiene and cleanliness are important on open surfaces such as in toilets. In another embodiment of the present disclosure, AgCl may be treated on to surfaces of pottery toilet liners to render the toilet bacteria free especially in the so-called less developed countries where the pit-latrine is more prevalent, and where sanitary surfaces must be of minimal cost. One of the advantages of this pottery toilet is that the production and installation of such toilet liners is so simple that it can be undertaken almost anywhere. The pottery toilet liner comprises primarily of clay and water. The porous surfaces around pit latrines are a breeding ground for bacteria, and appropriate low-cost sanitation alternatives are lacking. The present disclosure addresses this problem and provides a remarkably inexpensive and easy method of silver chloride treatment to sanitize the surfaces around the openings of pit latrines. Further, the pottery toilet liner treated with silver chloride would cost under US $1.00, thus providing an affordable alternate disinfectant to the rural poor.

One of the great advantages of these toilet liners is that they can be fired in traditional, low fire kilns of village potters, up to a temperature of 600° C. Such low temperature is possible because fracture strength is generally not an issue. Thus, the higher temperature that is needed to fire the pottery water purifiers becomes unnecessary. For example, the toilets can be fired in lowest tech, traditional kilns, whether on open fire, bon fire or bee hive kiln. However, the liners may also be fired at temperatures higher than 600° C.

Further, it should be quite feasible to undertake the silver chloride treatment under the supervision of high school chemistry departments or even local pharmacies. Then the liners are mortared in iMace, in much the same way that tiles are set, using a simple concrete mortar. This method appears to be quite appropriate for such low temperature fired pottery toilets.

After firing the toilet liner, this is treated with silver chloride according to the following method. First, it is saturated with silver nitrate and then dried. The dried toilet liner then contains dispersed silver nitrate salts of small size. Second, the toilet liner is saturated with salt water (sodium chloride) obtained from table salt. In the ensuing reaction, silver chloride is deposited and the remaining silver nitrate salts are flushed over time. In this process, soluble silver nitrate is replaced by relatively insoluble silver chloride, which remains within the pottery as the primary disinfectant that renders a sanitary surface to the pottery toilet.

Additional alternatives to this embodiment include the treatment of silver chloride on to pottery toilets, which resemble the conventional porcelain ones. These toilets include an 'S'-curve pipe, which contains water, thus isolating the room of the toilet from the container of the waste. Several models of such sanitary pottery toilets include the sit down toilet, as used in the west, and the low profile, squat toilet, as used in many countries of Africa, Asia, etc. Such sanitary pottery toilets are intended as a low cost alternative to glazed porcelain ones, which in their isolation from the waste provide an added degree of sanitation.

According to another embodiment of the present disclosure, AgCl may be applied to pottery containers, made by village potters fired to around 600° C., containers used for storing water.

According to another embodiment of the present disclosure, silver chloride may be used to treat food preparation surfaces. For example, terra cotta tiles can be treated, for use in a counter top.

According to another embodiment of the present disclosure, silver chloride may be used in the treatment of grog/cement mortars and grouts. For example, AgCl treated grog powder can be mixed with cement to produce a mortar, which is appropriate for use between portions or tiles of food preparation surfaces. This includes treatment prior to the laying of the surface or treatment following the laying of the surface. In this case an existing, porous ceramic surface can be treated in situ. Alternatively, a mortar that has already set, and was not pre-treated, can then be treated with AgCl according to the method of the present invention.

According to another embodiment of the present disclosure, AgCl may be used to treat and disinfect existing brick and tile surfaces, in order to render these surfaces free of bacteria and other harmful microorganisms.

According to another embodiment of the present disclosure, silver chloride treatment may be treated on to porous surfaces that are non-ceramic. Thus, it may be possible to treat silver chloride on to surfaces of concrete and wood, plaster of paris, etc., because AgCl was found to be effective in making porous surfaces bacteria free.

According to another embodiment of the present disclosure, a water purification device is a silver treated, packed particle bed systems. As with monolithic filters (usually candle filters or disk filters), E coli and other pathogens are killed or disabled by contact with the silver, and additionally, particles are filtered out of the system.

The packed particle bed water filter systems may have a grog, that is, a pre-fired clay material that has been crushed, granulated and sized appropriately. Packed particle bed systems can be of varying particle sizes, and varying particle size distribution, and much of what constitutes suitable particle size distribution pertains to the subsequent, appropriate flow rate. The grog to be used can be in several different forms.

Several different materials can be selected for appropriate use as grog, and one strong, positive attribute for these will be in maximizing the amount of internal surface area. In increasing the amount of internal surface area there are more and more opportunities for the silver to become situated. Thus there are more opportunities for the pathogens to make contact with the silver.

Following are several different choices for the grog, each of which must be sized appropriately. As with monolithic filters, whether high grog or high feldspar, these materials will have been fired to between about 1000 degrees C. and 1150° C.

Grog can be made from broken, bisqued pottery. This broken pottery may tend to be obtainable from reject pieces of pottery ware, that have broken in the firing, since in every pottery there is always some percentage loss.

Grog may made using a burn out material, mixed in with the clay. Such material as wheat flour, or another fine grained material can be suitable.

'Expanded Shale,' is not a grog, per se, but this material can be used as a grog. Expanded shale may be those sold under the brand name Haydite. Expanded shale is made from shale rock that has been crushed to size, then fired in a rotating, rotary kiln. The expanded shale, once fired, bloats, or pops like popcorn. Thus them is a lot of internal surface area. The abundance of internal surface area in expanded shale allows the silver disinfectant to be situated making it one reason expanded shale works well in packed particle bed systems. This material is normally used as a light weight aggregate for purposes of construction. Thus, for example, a concrete that is made using this material will be somewhat light weight.

A high feldspar grog can be made, and in this event the sizing and particle size distribution is done using the same methodologies that are used for the other forms of grog that are here mentioned. High feldspar grog will have the advantage that it has a lot of internal surface area.

Each of the four materials, above, can be made appropriate, though the systems in which the grog material has a lot of internal surface area will tend to be smaller systems. The smaller systems will be made possible because there will have been more opportunity for the pathogens to contact the silver.

As with the monolithic filters, in determining the correct flow rate this should account for a 'residence time,' for the E coli and other pathogens, within the filter medium. The residence time is that period of sustained contact, of the E coli with the silver. For monolithic filters that have been made in the past, this residence time has been 20 minutes. But a more recent rule of thumb has been to allow for as low as 6 minutes of residence time, since this has been found to be adequate.

For the monolithic filter, selecting suitable particle size distribution has been to see that 80% of the grog particles are between 30 and 80 mesh, with the remaining 20% sub 80 mesh. This distribution normally gives a candle filter that has between 2.0 and 3.0 liters per hour of flow.

Particle size distribution is accounted for in much the same way for packed particle bed systems, with the same percentages and particle sizes, however for packed particle bed systems that are larger than that of a household the particle sizes will tend to be larger. In part, for the larger systems this is to account for additional water column height, and a deeper filter bed, through which the contaminated water must pass.

For packed particle bed systems that are larger than that of a household, the particles will tend to be far more coarse. There will tend to be particles/granules that are as large as the size of a pea, around ¼ inch, or at times larger, and the percentage of finer particles will be less. Again, suitable particle size, and particle size distribution is determined experimentally, where the systems sizes will tend to vary.

The maintenance of packed particle bed filters primarily involves a methodology for removing those particles that have become lodged within the filter medium, as a result of using contaminated water that is turbid. Removal of the particles can be accomplished in several ways described below.

1. Build in a back-flush bed, of finer grog particles, that are in two thin layers, one at the upper end of the system, and one at the lower end. Thus the particles of a contaminated, turbid water will tend to collect within the back-flush bed, and with time this will bring about a slower rate of flow for the system. In this event, the smaller systems that include these beds can be turned up-side-down with water then run through. Thus the particles are eliminated from the back-flush bed, and the system can continue to be used normally.

2. For larger systems, the upper layer of grog can be dug away, where this upper layer will contain trapped particles. The material that has been dug away can then be washed out, for replacement within the system. Or, the material that has been dug away can be discarded, as per #3.

3. The grog that contains a lot of particles can possibly be discarded, since the material may tend to be inexpensive. In this event new, clean grog can be placed into the system.

As to the silver treatment, this can be accomplished in several ways. A usual method will be to saturate the filter medium with silver nitrate (AgNO3), though other forms of silver may also be appropriate for use. A silver nitrate solution of appropriate dilution should be used, and this will be around 250 mgs. of silver nitrate salts per liter of water. To saturate the dry grog, the silver solution can either be poured into the grog, or the grog can be poured into the silver solution.

The silver treated, packed particle bed material is then dried, and fired for a second time, though to only 500 to 600 degrees C. At this temperature the nitrate will have burned off, and the silver will have become optimally situated within the filter medium i.e. the grog.

In another embodiment, the filter may be monolithic filters. Filter candles may also be formed through extrusion, and an extrusion composition is formed as a filter through the use of an extruder. This extruder can be either a mechanized machine, or a simple hand operated machine, that is not mechanized. The hand operated extruder is usually attached to a wall, with the extrusion happening in a downward direction.

Extrusion compositions will tend to have ~25% water content, which percentage is substantial greater than is the case for the damp pressed filters of other embodiments, and with the damp pressed filters of several of the patents, these have had a specified water content of between 8 and 15%.

Extrusion compositions will also tend to indicate amounts of clay per grog at about 50/50, as is the case with the damp pressed filters. One advantage of the extruded filters is that the ~25% water content allows for this kind of forming, which can be carried out quickly. When starting any new production, experimentation should be done, to maximize the amount of grog in the composition, along with a re-adjustment of the particle size distribution. So for example, minimize the amount of plastic clay in use, to the point where the candle fails in strength tests. Some starting compositions, along with 50/50, grog to clay, are within the range of, 60/40, grog to clay, 70/30, grog to clay, etc.

The methods of controlling the openness of the filter are several. 1. There is opening of the filter structure due to the clay shrinking away from the grog, in the processes of its drying and its firing. 2. Particle size distribution of the grog is changed, so as to maximize the amount of space between grog particles/granules.

For example, it is known in the art that a form of optimal packing comes about, when 22% of the particles/granules are of a certain fine size, and the other 78% of the particles are of a certain large size. Any differing percentages of fine versus large particles/granules contribute to more space within the permeable structure, and certain percentages of certain particle sizes maximize the amount of space between the particles.

As a result of this arrangement there is a structure of voids, that can be thought of as being within a skeletal structure of the resultant pottery/terra cotta. During the process of firing, the clay and the grog have become as one pottery material, and prior to the sintering temperature the grog particles, per sizes and maximum void space, have held the structure open.

It is the control of the amount and the shape of the void space, which determines whether more or less flow occurs. As above, for the extruded candle, the aim during initial development of a filter project is to make the volume of the filter element equal to the volume of filtered water, 1. every 20.0 minutes, at the one hand, to 2. every 6.0 minutes at the other hand. Thus there has been the optimal period of residence time.

A second, optimized approach, in opening the structure of an extruded candle is to use particles/granules of grog, which are much more coarse than previously indicated. For example, for the candle wall thickness, which is 2.5 cms., ten granules of grog, of equal distance across are used to span the distance of the thickness of the wall i.e. each particle/granule is 0.25 cms., distance across, so it takes ten of these particles/granules to span the 2.5 cm. wall thickness.

Packing particles/granules of this size, each about 0.25 cms., there will be lots of voids between them. This void space can be filled with clay, which has not been pre-fired into grog, or by some combination of clay and fine grog particles. Thus, during drying and firing the clay pulls away from the grog, leaving voids. With a number of ways of controlling the disposition of the voids and the solid, fired clay/grog combination, the flow rate is adjustable as appropriate.

Figure 2:
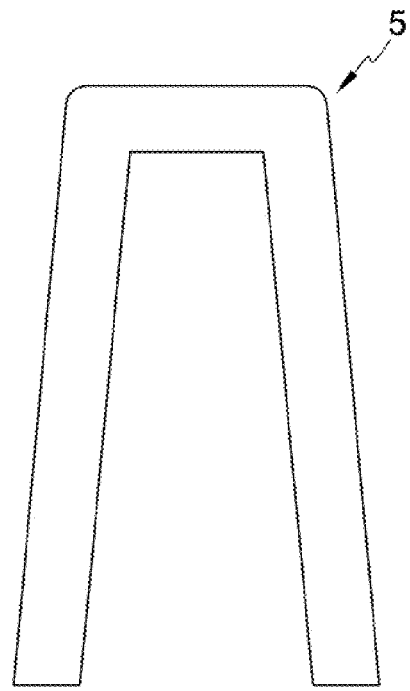
FIG. 2 is a cross-sectional side view of the liquid purification filter of FIG. 1.

Referring to the drawings, FIG. 1 shows a perspective view of a preferred shape for the water purification filter 5. FIG. 2 illustrates a cross-sectional side view of the preferred shape for the filter 5. Methods of creating a mold and die set which can press the body into the preferred shape illustrated in FIG. 1 and FIG. 2 are well known in the art.

Figure 3:
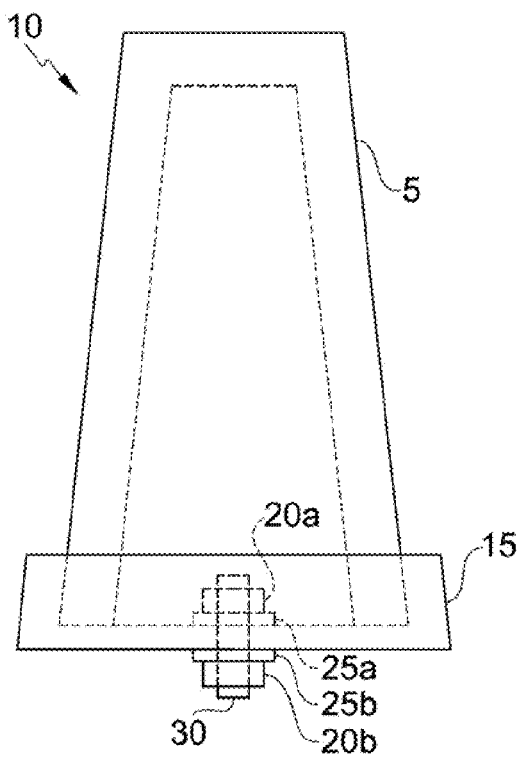
FIG. 3 is a cross-sectional side view of an exemplary liquid purification device incorporating the liquid purification filter of FIG. 1 and FIG. 2.

FIG. 3 illustrates a cross-sectional side view of a preferred embodiment in which the water purification filter 5, illustrated in FIG. 1 and FIG. 2, may be utilized in a water purifier 10. The filter 5 is attached to a cap 15, The filter 5 may be attached to the cap 15 using any suitable connection means known in the art. In a preferred embodiment, the filter 5 is attached to the cap 15 using a small amount of white cement, tile grout. In another preferred embodiment, the filter 5 is attached to the cap 15 using a wax sealant. In another preferred embodiment, the filter 5 is attached to the cap 15 using a gum sealant. In a further embodiment, the filter 5 is attached to the cap 15 using attachment straps or bolts which secure the filter 5 to the cap 15. The perimeter of the cap 15 should be sealed so that nonpurified water cannot circumvent the filter 5 and enter at the perimeter of the cap 15. The cap 15 may be made of any non-toxic material. In a preferred embodiment, the cap 15 is made of non-toxic plastic. In another preferred embodiment, the cap 15 is earthenware. In a preferred embodiment, the interior cavity formed by the filter 5 and the cap 15 may be filled with powdered porous grog. In this embodiment, the powdered porous grog may be coated with silver material. This silver material may be applied in its colloidal form, silver metal or as AgCl.

The cap 15 has a hole of sufficient diameter for a threaded tube 30. The tube 30 may be sealed and attached to the cap 15 by any appropriate means known in, the art. The tube 30 may be composed of any material which is non-toxic. In an embodiment of the present invention, the tube 30 is composed of iron, brass, or plastic, which include external threads in one fixture. As illustrated in FIG. 3, the tube 30 is sealed to the cap 15 with washer 25a on the interior side of the cap 15 and washer 25b on the exterior side of the cap 15. Washer 25a and washer 25b are secured against the interior and exterior sides of the cap 15 by nut 20a and nut 20b. In an embodiment of the present invention, nut 20a and nut 20b fit on the external threads of tube 30 and tighten washer 25a and washer 25b against the cap 15. Alternatively, no nut is required inside the cap, where the cap and tube are inclusive in one part.

Figure 4:
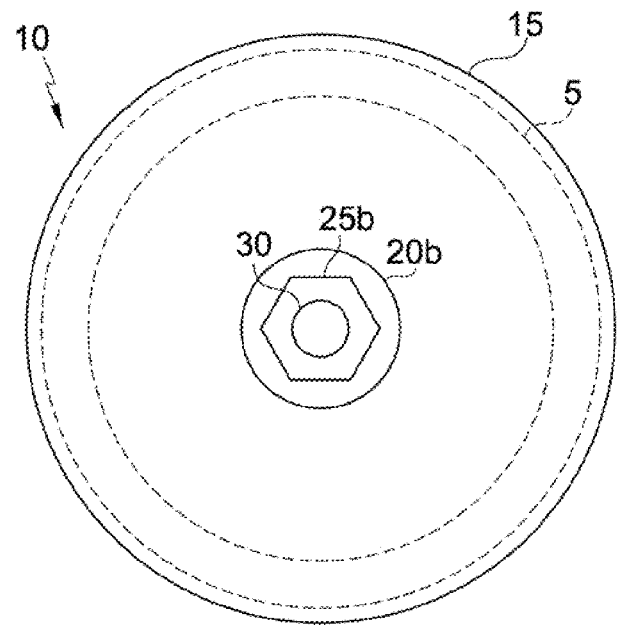
FIG. 4 is a cross-sectional bottom view of the liquid purification device of FIG. 3.

FIG. 4 illustrates a cross-sectional bottom view of the water purification filter 5 being utilized in the water purifier 10 of FIG. 3. The cap 15 is shown attached to the filter 5. The tube 30 is inserted through the cap 15. The tube 30 is sealed to the exterior side of the cap 15 by washer 25b. Washer 25b is tightened against the exterior of the cap 15 by nut 20b.

FIG. 5 illustrates a perspective view, with portions in section, of a water purifier system 70 utilizing the water purifier 10 of FIG. 3 and FIG. 4. The purifier 10 is contained in an upper reservoir 40. The upper reservoir 40 may be covered with an upper lid 35 to protect against evaporation, the elements and debris.

The upper reservoir 40 has a hole of sufficient diameter to allow the insertion of the tube 30. The tube 30 is inserted through a hole in a lower lid 46 and passes into a lower reservoir 50. In this embodiment, the lower reservoir 50 has a pour spout 65.

Nonpurified water 45 is placed in the upper reservoir 40. The nonpurified water permeates through the filter 5 of the purifier 10 and exits the tube 30 as exit liquid 55. The exit liquid 55 falls into the purified liquid 60 which is contained by the lower reservoir 50. The pour spout 65 may be used to release the purified liquid 60.

In a preferred embodiment, the purifier system 70 is designed to have a flow rate through the purifier 10 of at least about 0.4 liter per hour. In a preferred embodiment, it may be necessary to periodically replenish the amount of nonpurified water 45 in the upper reservoir 40 to maintain a rate of flow of at least about 0.4 liter per hour.

While the water purifier system 70 illustrated in FIG. 5 is shown with one filter 5 and one purifier 10, the invention is not so limited and may utilize as few as one filter 5 or one purifier 10 up to as many filters 5 or purifiers 10 as will fit in the bottom of the upper reservoir 40.

Figure 6:
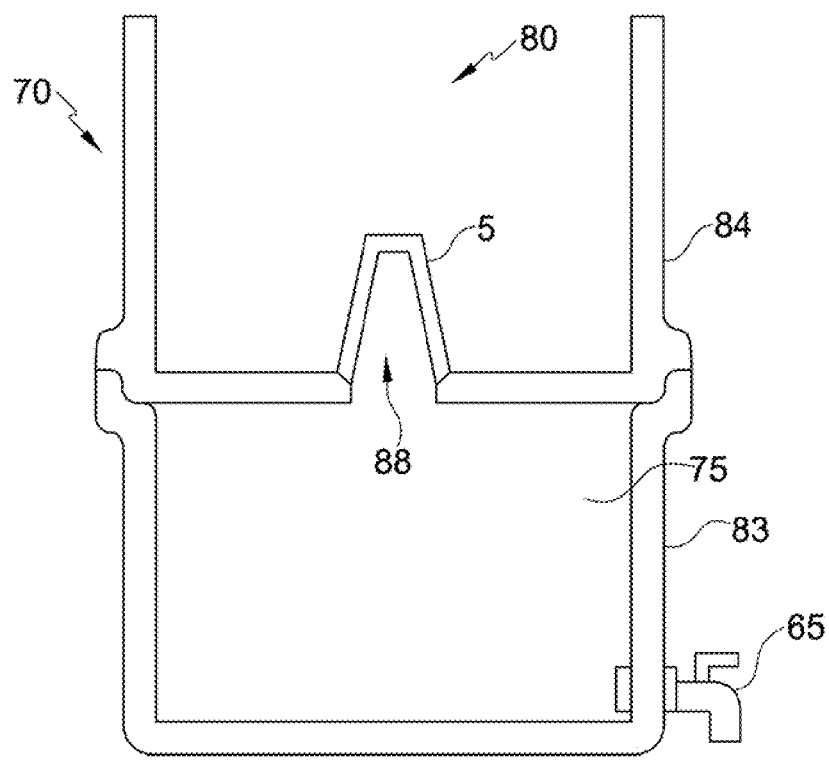
FIG. 6 is a cross-sectional side view of a further exemplary liquid purification system incorporating the liquid purification filter of FIG. 1 and FIG. 2.

FIG. 6 illustrates a cross-sectional side view of the water purification filter 5, illustrated in FIG. 1 and FIG. 2, utilized in a further exemplary water purifier system 70. The water purifier system comprises an upper container 84 which may be removably placed on a lower container 83. The bottom of the upper container 84 has a hole 88 into which fits the water purification filter 5. The filter 5 may be sealed against the bottom of the upper container 84 by any suitable sealing means known in the art. In a preferred embodiment, the filter 5 is sealed against the bottom of the upper container 84 using a small amount of silicone sealant. In another preferred embodiment, the filter 5 is sealed against the bottom of the upper container 84 using a wax sealant. In another preferred embodiment, the filter 5 is sealed against the bottom of the upper container 84 using a gum sealant. The perimeter of the edge of the filter 5 that is in contact with the bottom of the upper container 84 should be sealed so that nonpurified water cannot circumvent the filter 5 and enter at the perimeter of the edge of the filter 5.

Nonpurified water is poured into the upper reservoir 80 of the upper container 84. The nonpurified water permeates through the filter 5 and exits as purified water where it is collected in the lower reservoir 75 of the lower container 83. The purified water may be obtained from the lower reservoir 75 via a pour spout 65 which is connected through the lower container 83. In an embodiment of the water purifier system 70 illustrated in FIG. 6, the upper reservoir 80 may optionally be covered by a lid to protect the nonpurified water in the upper reservoir 80 against evaporation, the elements and debris.

The upper container 84 and the lower container 83 are composed of non-toxic, relatively water impermeable materials. In a preferred embodiment, the upper container 84 and the lower container 83 are composed of earthenware or plastic. The upper container 84 may be composed of the same type of material as the lower container 83. However, the upper container 84 and the lower container 83 do not necessarily have to be comprised of the same type of material. The upper container 84 and the lower container 83 may be of any shape and capacity which provide a flow rate through the filter 5 of at least about 0.4 liter per hour. In a preferred embodiment, the upper container 84 and the lower container 83 are cylindrical in shape. In a preferred embodiment, the capacity of the lower reservoir 75 of the lower container 83 is of sufficient volume to provide storage of an average daily drinking water requirements of a user or users yet not of o large of volume as to create a purified water retention time which would allow re-breeding of bacteria to occur.

Figure 7:
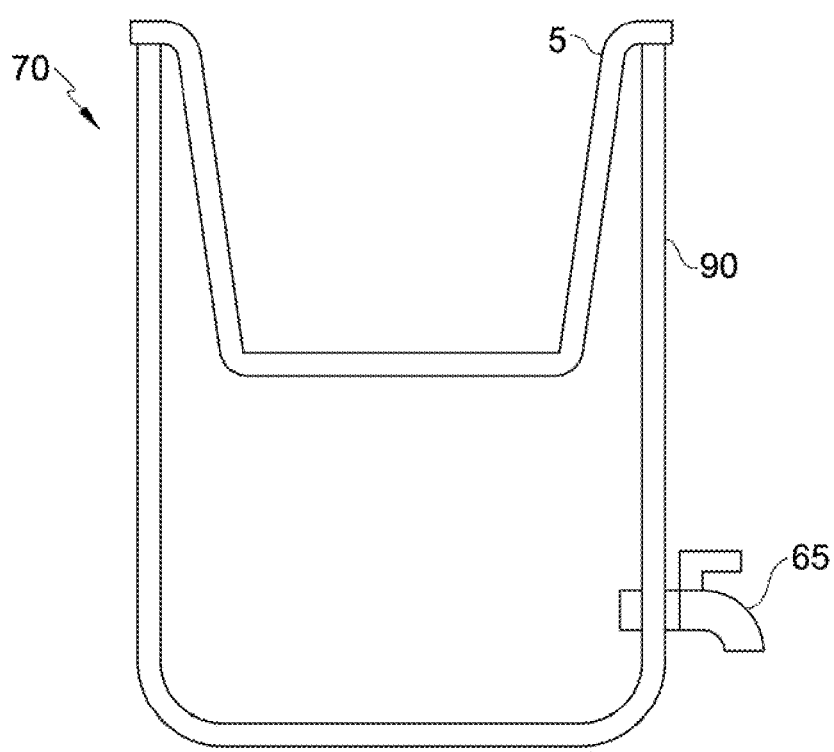
FIG. 7 is a cross-sectional side view of a further exemplary liquid purification system incorporating the porous grog of the present invention.

FIG. 7 illustrates a cross-sectional side view of an alternatively shaped water purification filter 5 utilized in a further preferred embodiment of the water purifier system 70. As illustrated, the filter 5 is removably placed on the reservoir 90. In a preferred embodiment, the filter contains porous grog in an amount between about 40% to about 60%, by weight, of the body composition. Optionally, the filter 5 may be covered with a cap or lid to prevent water contained in the filter 5 from evaporating or becoming further contaminated.

Nonpurified water is poured into the filter 5. The nonpurified water permeates through the filter 5 and exits as purified water which is collected in the reservoir 90. The purified water may be obtained from the reservoir 90 via a pour spout 65 which is connected through the reservoir 90. The reservoir 90 is composed of non-toxic, relatively water impermeable materials. In a preferred embodiment, the reservoir 90 is composed of earthenware or plastic.

Figure 8:
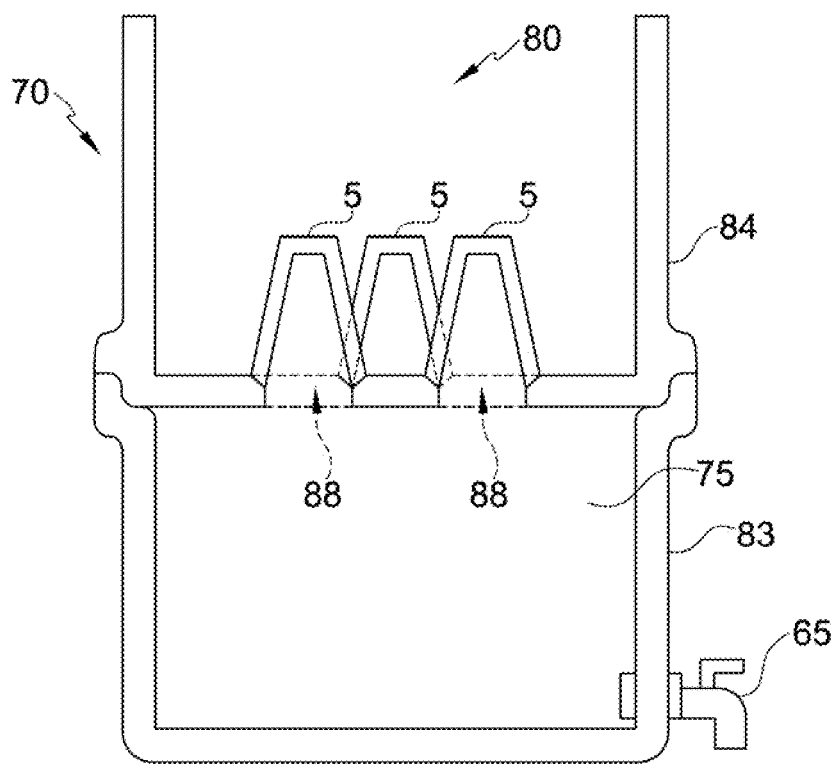
FIG. 8 is a cross-sectional side view of a further exemplary liquid purification system incorporating the liquid purification filter of FIG. 1 and FIG. 2.

FIG. 8 illustrates a cross-sectional side view of several water purification filters 5, illustrated in FIG. 1 and FIG. 2, utilized in a further preferred embodiment of the water purifier system 70. The water purifier system 70 illustrated in FIG. 8 is essentially the same as that shown in FIG. 6 and described above with the exception of the utilization of several filters 5. Where the water flow rate through a single filter 5 is not sufficient to meet the needs of a user or users, the use of multiple filters 5 has an advantage of increasing the water flow rate through the water purifier system 70. While the water purifier system 70 illustrated in FIG. 8 is shown with three filters 5, the invention is not so limited and may utilize as few as one filter 5 up to as many filters 5 as will fit in the bottom of the upper container 84.

Figure 9:
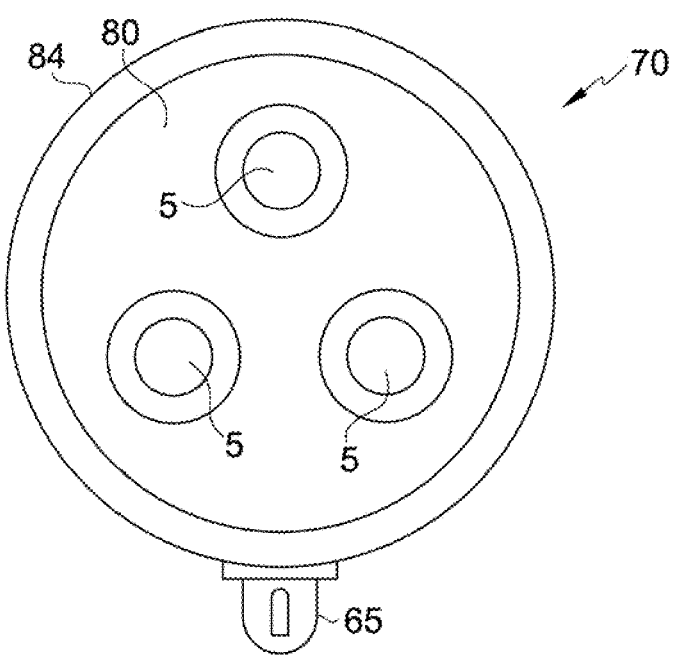
FIG. 9 is a perspective top view of the liquid purification system of FIG. 8.

FIG. 9 illustrates a top perspective view of the water purifier system 70 of FIG. 8. As shown in FIG. 9, the filters 5 are positioned in the bottom of the upper container 84.

Figure 10:
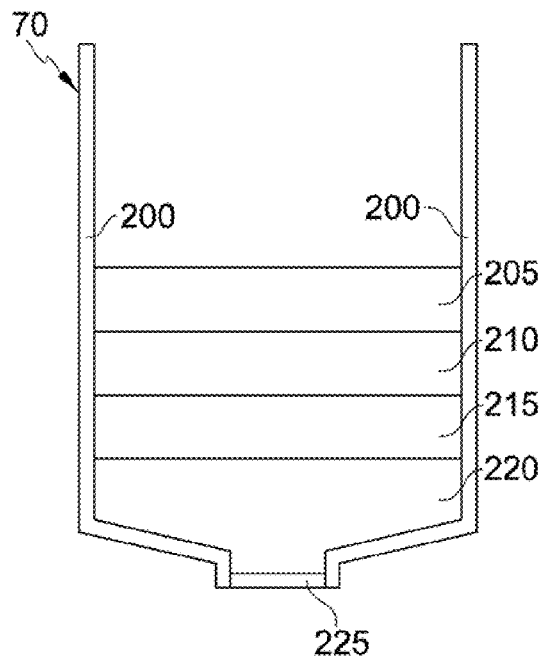
FIG. 10 is a cross-sectional side view of a further exemplary liquid purification system incorporating the porous grog of present invention.

FIG. 10 illustrates a cross-sectional side view of the porous grog of the present invention utilized in a further exemplary water purifier system 70. As illustrated in FIG. 10, a top layer 205, a first intermediate layer 210, a second intermediate layer 215 and a bottom layer 220 are bounded by a container 200 and a retention cap 225. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, this material is earthenware or plastic.

In a preferred embodiment, the top layer 205 comprises particles of sizes from about 4.0 mm to about 6.0 mm. In a more preferred embodiment, the top layer 205 comprises particles of sizes of about 5.0 mm. Preferably, the particles of the top layer 205 comprise stone, porous grog, or a mixture thereof.

In a preferred embodiment, the first intermediate layer 210 comprises particles of sizes from about 0.5 mm to about 1.5 mm. In a more preferred embodiment, the first intermediate layer 210 comprises particles of sizes of about 1.0 mm. Preferably, the particles of the first intermediate layer 210 comprise sand, porous grog, or a mixture thereof. In a preferred embodiment, the second intermediate layer 215 comprises particles of sizes of about 60 mesh to about 100 mesh. In a more preferred embodiment, the second intermediate layer 215 comprises particles of sizes of about 80 mesh. The particles of the second intermediate layer 215 comprise sand, porous grog, or a mixture thereof. In a preferred embodiment of the present invention, the bottom layer 220 comprises particles of sizes of about 100 mesh to about 140 mesh. In a more preferred embodiment of the present invention, the bottom layer 220 comprises particles of sizes of about 120 mesh. The particles of the bottom layer 220 comprise sand, porous grog, or a mixture thereof.

While the top layer 205, first intermediate layer 210, second intermediate layer 215 and bottom layer 220, as illustrated in FIG. 10, are shown as each having an equal depth, the invention is not so limited. The top layer 205, first intermediate layer 210, second intermediate layer 215 and bottom layer 220 may each independently be of equal or differing depth.

The retention cap 225, as illustrated in FIG. 10, prevents the top layer 205, first intermediate layer 210, second intermediate layer 215 and bottom layer 220 from exiting the container 200 while still allowing liquid to exit from the interior of the container 200. In a preferred embodiment of the present invention, the retention cap 225 comprises a mesh, plastic sieve screen. In a more preferred embodiment, the mesh, plastic sieve screen is from about 100 mesh to about 150 mesh. In another preferred embodiment of the present invention, the retention cap 225 is dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the dry pressed earthenware following firing.

According to the embodiment of the present invention illustrated in FIG. 10, nonpurified water is poured into the top of the container 200. The nonpurified water passes through the top layer 205, the first intermediate layer 210, the second intermediate layer 215, and the bottom layer 220. The water then permeates through the retention cap 225 and exits the water purifier system 70 as purified water.

Figure 11:
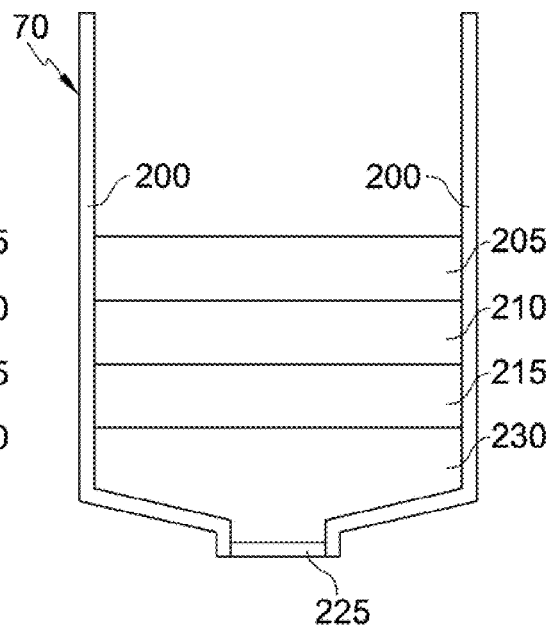
FIG. 11 is a cross-sectional side view of a further exemplary liquid purification system incorporating the porous grog of the present invention.

FIG. 11 illustrates a cross-sectional side view of the porous grog of the present invention utilized in a further exemplary water purifier system 70. As illustrated in FIG. 11, a top layer 205, a first intermediate layer 210, a second intermediate layer 215, and a purifier disk 230 are bounded by a container 200 and a retention cap 225. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, the material is earthenware or plastic.

In a preferred embodiment, the top layer 205 comprises particles of sizes from about 4.0 mm to about 6.0 mm. In a more preferred embodiment, the top layer 205 comprises particles of sizes of about 5.0 mm. Preferably, the particles of the top layer 205 comprise stone, porous grog, or a mixture thereof.

In a preferred embodiment, the first intermediate layer 210 comprises particles of sizes from about 0.5 mm to about 1.5 mm. In a more preferred embodiment, the first intermediate layer 210 comprises particles of sizes of about 1.0 mm. Preferably, the particles of the first intermediate layer 210 comprise sand, porous grog, or a mixture thereof. In a preferred embodiment, the second intermediate layer 215 comprises particles of sizes of about 60 mesh to about 100 mesh. In a more preferred embodiment, the second intermediate layer 215 comprises particles of sizes of about 80 mesh. The particles of the second intermediate layer 215 comprise sand, porous grog, or a mixture thereof.

As illustrated in FIG. 11, a purifier disk 230 is located adjacent to the second intermediate layer 215. The purifier disk 230 comprises dry pressed earthenware with a pre-fired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the purifier disk following firing.

According to the embodiment of the present invention illustrated in FIG. 11, nonpurified water is poured into the top of the container 200. The nonpurified water passes through the top layer 205, the first intermediate layer 210, the second intermediate lager 215, and permeates through the purifier disk 230. The water then permeates through the retention cap 225 and exits the water purifier system 70 as purified water.

Figure 12:
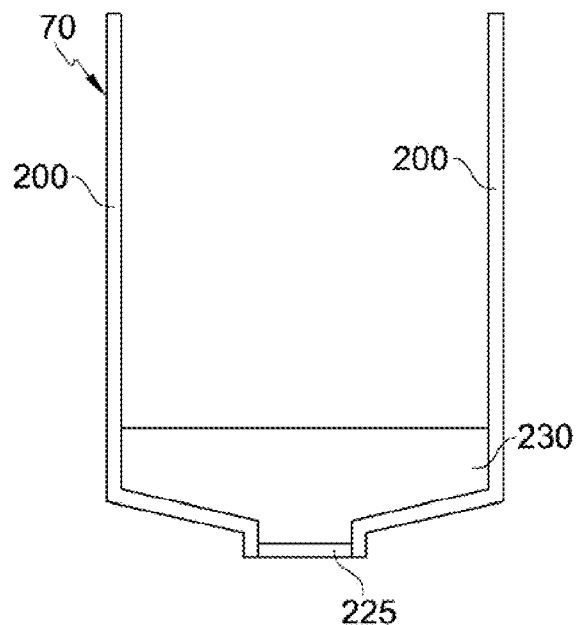
FIG. 12 is a cross-sectional side view of a further exemplary liquid purification system incorporating the porous grog of the present invention.

FIG. 12 illustrates a cross-sectional side view of the porous grog of the present invention utilized in a further exemplary water purifier system 70. As illustrated in FIG. 12, a purifier disk 230 is bounded by a container 200. Optionally, the container 200 may be covered with a cap or lid to prevent the interior of the container 200 from becoming contaminated by foreign particles. Preferably, the container 200 comprises a non-toxic, relatively water impermeable material. In a preferred embodiment, the material is earthenware or plastic.

As illustrated in FIG. 12, a purifier disk 230 is bounded by the container 200. The purifier disk 230 comprises dry pressed earthenware with a prefired body composition comprising clay, porous grog and combustible material. In a preferred embodiment, the body composition contains between about 30% and about 60% by weight of clay, between about 30% and about 60% by weight of porous grog, and between about 5% and about 20% by weight of combustible material. In a more preferred embodiment, the composition contains about 45% by weight of clay, about 45% by weight of porous grog and about 10% by weight of combustible material. In a preferred embodiment, silver is applied to the purifier disk following firing.

According to the embodiment of the present invention illustrated in FIG. 12, nonpurified water is poured into the top of the container 200. The nonpurified water permeates through the purifier disk 230 and exits the bottom of the container 200 as purified water.

For the permeable grog purifiers of the present invention, looking under a microscope it is clear that the filter medium is not homogenous with respect to permeability. The micrograph in FIG. 13 shows the fired purifier medium at 5× magnification. This micrograph shows many elongated pores 100, those primarily involved in bringing about control over the amount of flow. It should be noted that the larger white areas 101 indicate pores caused by burnout of a number of combined grains of flour. The larger dark areas 102 indicate some of the bigger particles of the 10 mesh grog. The micrograph indicates that the permeability varies from clump to clump, or particle to particle within the purifier.

FIG. 14 shows the micrograph of the un-fired purifier medium at 20× magnification. The dark areas 200 indicate the pre-fired grog and the grayish area 201 indicates the un-fired clay. The white areas 202 show pores where the composition was not fully compacted during mixing of the grog and the clay compositions. From these micrographs, it is evident that the most permeable material is the porous grog and the least permeable is the plastic clay necessary in facilitating forming the resultant porous grog purifier of the present invention.

Figure 15:
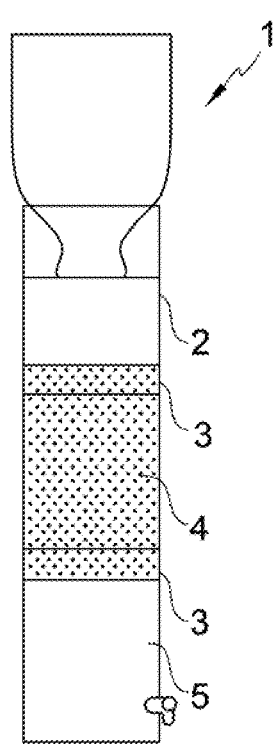
FIG. 15 is a sketch of a silver chloride treated porous grog purifier with a central porous grog purifying bed layer with two backflush layers.

FIG. 15 illustrates another embodiment of the invention wherein the water purifying device has a purifying bed layer comprising crushed porous grog particles with two backflush layers that also comprises crushed porous grog particles. Nonpurified water is poured into the top of the container such as from a water bottle 1 where the nonpurified water 2 passes through the top backflush layer 3 comprising crushed porous grog having particle sizes of 20 to 30 mesh, the intermediate purifying bed layer 4 comprising porous grog hiving particle sizes of 30 to 100 mesh and the bottom backflush layer 3 having particle sizes of 20 to 30 mesh. The porous grog particles are further treated with silver chloride for disinfection. The purified water then permeates through the retention cap and exits a water purifier system as purified water 5.

Figure 16:
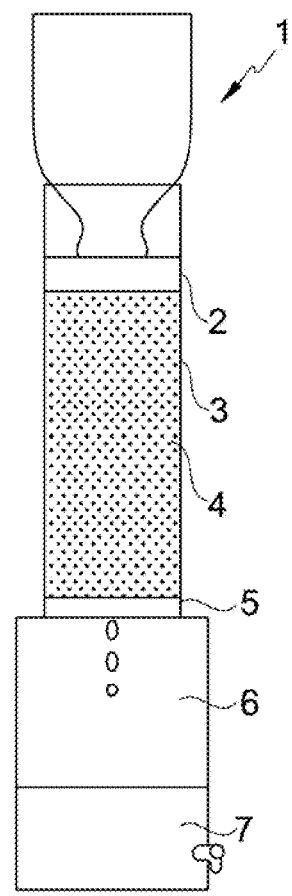
FIG. 16 is a sketch of the silver chloride treated elementary red-brick particulate water purification device of the present invention.

Referring to FIG. 16 an elementary version of the water purifier is shown. Unpurified water is poured through the top of a container using an inverted plastic bottle 1. The container 3 may be made from plastic, clay or metallic material. Preferably the container comprises clay material. The unpurified water 2 permeates through the silver chloride treated red brick particulate grog purifying bed layer 4 comprising particle sizes of 100 mesh and finer with and percolates through the retention cap 5 to the bottom container 6 as purified bacteria-free drinking water 7.

Figure 17:
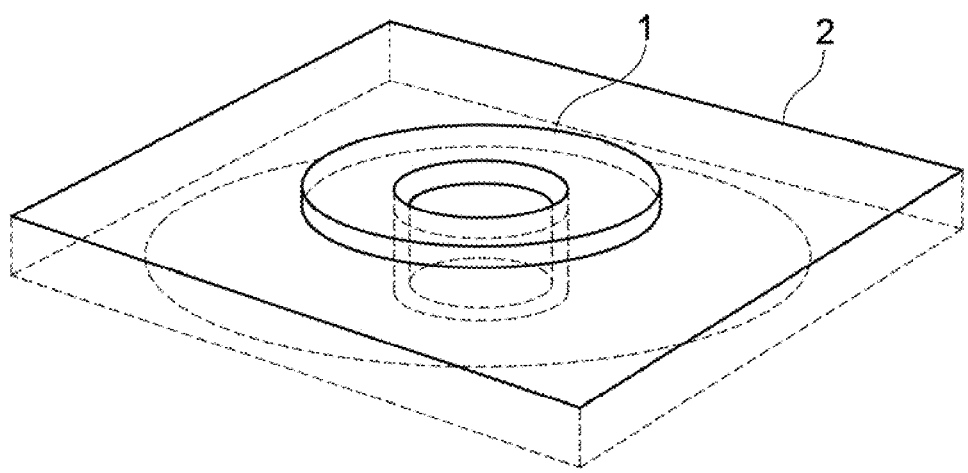
FIG. 17 is a sketch of the pottery toilet liner that is inset into a toilet aperture of a concrete slab.

FIG. 17 illustrates a pit latrine. The drawing indicates a silver chloride treated pottery toilet liner 1 that is inset into the aperture of a concrete slab 2, using a concrete mortar.

Figures 18A, 18B:
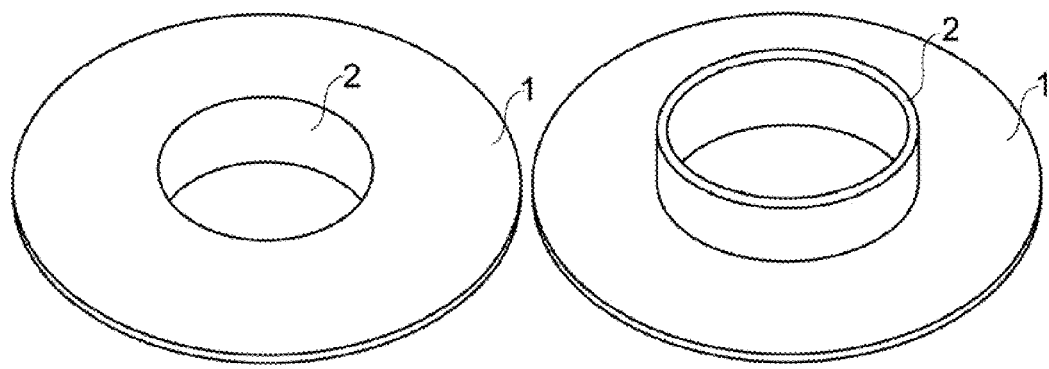
FIG. 18 (*a*) is a picture of the top view and (b) is a picture of the bottom view of the silver chloride treated pottery toilet liner.

FIGS. 18 (a) and (b) illustrates the top and bottom view of the pottery toilet liner respectively. This liner is a one piece device wherein the first circular flat piece of earthenware 1 is attached to a cylindrical second piece of earthenware 2 resulting in a cross sectional T shape with an aperture in the middle of the first piece 1.

Figure 19:
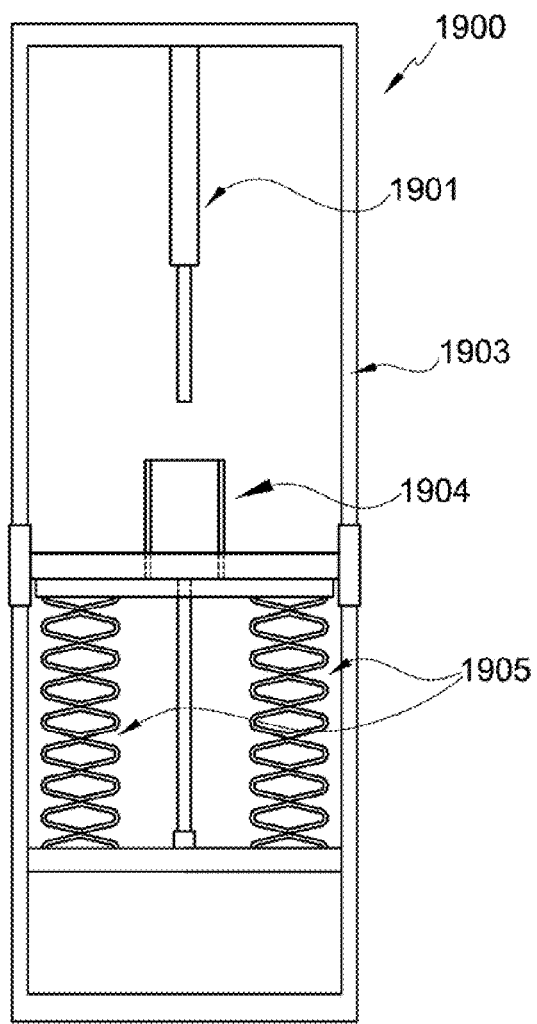
FIG. 19 illustrates an embodiment of a press used for the forming of purifier candles.

FIG. 19 illustrates an embodiment of a press for pottery purifier candles. The press shown is intended for quick production of pottery purifier candles. Note that the press has been designed with appropriateness in mind, that this could be fabricated in those countries where the purifier production is to be undertaken. The press 1900 is generally shown. An upper jack 1901 is used both to press the candle from the top and also to extrude the candle downwards. A press extension cylinder comprising a long pipe section with two ends closed may be used. A frame 1903 supports the press 1900. A candle die 1904 is open at both ends, the flat platen may be bolted to the frame. A pressing cylinder 2001 (FIG. 20) is pressed into the candle die 1904 from the top. A spindle 2002 (FIG. 20) represents the space of the inside of the candle. The spindle 2002 may be tapered with slightly less diameter at the top. The springs 1905 below the platen and dies push back, as the jack at the top applies force. After applying the desired force indicated by a gauge the jack is used again, applying force to the candle die 1904, thus releasing the spindle.

Pressing with one jack has implicit to the process the problem that the lower end of the candle is somewhat less dense than the upper end. However, these type of candles have performed well both in the lab and in the field. For the candles formed with a press having a jack at the top and two car springs below, these have a more uniform density. Without this uniform density the purifier medium would offer a somewhat lesser opportunity for the removal of the pathogens or the particles. In applying equal force to the candle, both from top and bottom, the use of the jack and spring press will make it easier to optimize a lesser amount of silver application, for example, as well as optimization of other variables.

The press as shown in FIG. 19 may be used in the following pressing cycle as shown in FIG. 21. The pressing and extension cylinders are removed. Unbolted, the candle die 1904 is placed over and onto the spindle 2002. A weighed amount of the candle composition is poured into the cavity of the die set. Tamping down of this material should be done three or four times during the process of charging. The composition is filled up to within one half inch of the top of the die 1904. The press extension cylinder is placed over the composition within the die. The long pressing cylinder is set vertically in place within the die and above the composition. The jack 1901, which is at the top, is lowered to the top of the long extension cylinder 1905. As the springs on the base push upwards, the composition is thoroughly compacted. Applying force from top and bottom better helps to insure a uniform density. The tiny voids within the candle, at the top and the bottom, will be of the same size so the flow rate of the candle will be the same regardless of the location per height. The jack 1901 and the springs 1905 are retracted and the steps in extruding the candle are then pursued. A small pallet is placed on top of the spindle 2002 for receiving the candle by downward extrusion. The extrusion is accomplished, first by placing the extension tube on top of the candle. Then the jack 1901 is pumped, pushing the candle out of the die 1904 onto the pallet. To get ready for the next pressing, there is a small amount of cleaning of the die 1904, spindle 2002, and other parts, removing the remnants of the composition of the former pressing. Then a small amount of lubricant is applied to the spindle 2002 and inside of the die 1904 for subsequent pressing.

FIGS. 22 and 23 illustrate embodiments with a two bottle system. For the two bottle system shown, a strong tangible attribute is that virtually all of the components should be available locally so there is little or no need for imported items. In FIG. 22, the two bottles shown on the right are coupled together with the lower one containing silver treated or $Fe^{3+}$ treated grog. Before coupling the two bottles together, the grog filled container is further filled with contaminated water. Then an empty bottle is coupled on top. After some suitable residence time for the pathogens within the grog medium to make contact with the silver or the $Fe^{3+}$, the system is turned up-side-down. The purified water flows into the previously empty container ready to drink.

FIG. 23 illustrates a variation on the two bottle system. The empty bottle is in the down position with the grog filled bottle on top. The upper portion of the grog filled bottle is a cut away, as per the dotted lines, making it possible to till an upper reservoir with water. The contaminated water in the upper reservoir filters through the grog bed and is purified.

FIG. 24 illustrates an embodiment with a water tower 2400. The dotted lines indicate three portions. The middle portion is the grog bed while the top is the contaminated water and the bottom is the purified water. The contaminated water in the top portion filters through the grog bed and tills the lower portion.

FIGS. 25 (a) and (b) illustrate an embodiment of a pottery water system 2500. A silver treated disk 2501 of the system is mortared in place just above a funnel 2502. The disk has a slight taper so that the filtered water runs to the center where it drips into the funnel 2502. The cylinder 2506 of the system is low fired to only 600° C., thus it is low priced. The filtered water runs off of the system through a tube 2505 and is collected by placing the cut-off end of a small bottle 2503 into a small receptacle 2504. Since the tube 2505 is inset into this receptacle 2503, it is not possible for dirty hands to touch this. Similarly there is never any reason to touch the underside of the disk. Thus the filtered water cannot be recontaminated. The top view shows a framework of bamboo and nylon line supports that protects the system. Alternatively a net can be stretched over the system, to protect the pottery, eliminating the need for the bamboo. FIG. 25 (b) illustrates the pottery water system in a perspective view. Bamboo and nylon line are a support feature protecting the pottery edges, especially since the system must occasionally be up-ended in order to remove the particles resulting from turbidity. A small stick 2507 is shown, supporting the receptacle that is used for collecting the water. Additional are two small sticks 2508, which support the funnel inside.

The micrograph in FIG. 26 show the microstructure of a 20/80 clay/feldspar filter fired to 1090° C. The microstructure is open, allowing for flow.

The micrograph in FIG. 26 show the microstructure of a 20/80 clay/feldspar filter fired to 1230° C. The microstructure is closed and is vitrified.

Although the present invention has been described in terms of particularly preferred embodiments, it is not limited to these embodiments. Alternative embodiments and modifications, which would still be encompassed by the invention, may be made by those skilled in the art, particularly in light of the foregoing teachings. Therefore, the following claims are intended to cover any alternative embodiments, modifications or equivalents which may be within the spirit and scope of the invention as defined by the claims.

What is claimed is:

1. A device for purifying water comprising a silver treated packed particle bed, the particle bed comprising particles selected from the group consisting of
    grog or expanded shale.
2. The device of claim 1 wherein the grog comprises bisqued pottery.
3. The device of claim 1 wherein the grog comprises a burn out material mixed with clay.
4. The device of claim 1 wherein about 80% of the particles in the packed particle bed have a size of between about 20 and about 80 mesh and about 20% of the particles in the packed particle bed have a size of sub 80 mesh.
5. The device of claim 1 further comprising a back-flush bed.
6. The device of claim 5 wherein the back-flush bed comprises one layer at the upper end of the device and one layer at the lower end of the device.
7. The device of claim 1 wherein the silver is silver nitrate.
8. The device of claim 1 wherein the packed particle bed comprises particles that have been fired between about 1000° C. to about 1150° C., treated with silver, and then fired a second time from 500° C. to about 600° C.
9. The device of claim 1 wherein the grog comprises feldspar grog.

* * * * *